(12) United States Patent
Ikeda

(10) Patent No.: US 9,313,346 B2
(45) Date of Patent: Apr. 12, 2016

(54) INFORMATION PROCESSING SYSTEM, INFORMATION PROCESSING APPARATUS, INFORMATION PROCESSING METHOD, AND PROGRAM THEREFOR

(75) Inventor: Motoki Ikeda, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 1003 days.

(21) Appl. No.: 12/493,333

(22) Filed: Jun. 29, 2009

(65) Prior Publication Data
US 2010/0007916 A1 Jan. 14, 2010

(30) Foreign Application Priority Data

Jul. 11, 2008 (JP) ................................. 2008-181980

(51) Int. Cl.
*H04N 1/00* (2006.01)
*H04N 1/32* (2006.01)
*H04N 1/44* (2006.01)

(52) U.S. Cl.
CPC ........... *H04N 1/00347* (2013.01); *H04N 1/444* (2013.01); *H04N 1/32122* (2013.01); *H04N 1/4406* (2013.01); *H04N 2201/001* (2013.01); *H04N 2201/0039* (2013.01); *H04N 2201/0094* (2013.01); *H04N 2201/3204* (2013.01); *H04N 2201/3214* (2013.01); *H04N 2201/3215* (2013.01); *H04N 2201/3219* (2013.01); *H04N 2201/3221* (2013.01);
(Continued)

(58) Field of Classification Search
CPC ............ H04N 1/00347; H04N 1/4433; H04N 2201/3204; H04N 2201/3219
USPC .............. 358/1.14, 1.15, 1.9, 2.1, 537; 718/1, 718/100, 106; 713/189; 709/205, 229
See application file for complete search history.

(56) References Cited

U.S. PATENT DOCUMENTS

| 7,484,104 B2 * | 1/2009 | Masui et al. .................. 713/189 |
| 7,613,412 B2 | 11/2009 | Harada et al. |
| 7,898,681 B2 * | 3/2011 | Machida ...................... 358/1.15 |

(Continued)

FOREIGN PATENT DOCUMENTS

| JP | 8-307627 A | 11/1996 |
| JP | 2005135373 A | 5/2005 |

(Continued)

OTHER PUBLICATIONS

Japanese Office Action issued in counterpart application No. JP2008-181980, issued Aug. 3, 2012.

(Continued)

*Primary Examiner* — Jamares Q Washington
(74) *Attorney, Agent, or Firm* — Rossi, Kimms & McDowell LLP

(57) ABSTRACT

An information processing system in which a source information processing apparatus is capable of performing a job cooperatively with a destination information processing apparatus, is provided. The system includes an instruction unit configured to cause the source information processing apparatus to submit a cooperative job to the destination information processing apparatus, and a control unit configured to restrict manipulation of the submitted cooperative job at the destination information processing apparatus and to enable the manipulation of the cooperative job according to an instruction from the source information processing apparatus.

10 Claims, 20 Drawing Sheets

(52) U.S. Cl.
CPC ............... *H04N 2201/3222* (2013.01); *H04N 2201/3273* (2013.01); *H04N 2201/3274* (2013.01)

(56) References Cited

U.S. PATENT DOCUMENTS

| | | | |
|---|---|---|---|
| 8,009,310 B2* | 8/2011 | Tanaka et al. | 358/1.15 |
| 8,023,139 B2* | 9/2011 | Sakai | 358/1.15 |
| 8,189,217 B2* | 5/2012 | Ohba | 358/1.14 |
| 8,537,385 B2 | 9/2013 | Iizuka et al. | |
| 2005/0114267 A1 | 5/2005 | Miwa et al. | |
| 2005/0134903 A1* | 6/2005 | Tanimoto et al. | 358/1.15 |
| 2005/0243363 A1* | 11/2005 | Muto | G06F 3/1207 358/1.15 |
| 2007/0081186 A1 | 4/2007 | Numata | |
| 2007/0233687 A1* | 10/2007 | Iwase | G06F 21/608 |
| 2007/0268512 A1* | 11/2007 | Sakakibara | G06F 3/1207 358/1.14 |
| 2009/0122333 A1* | 5/2009 | Kato | G06F 3/1204 358/1.15 |

FOREIGN PATENT DOCUMENTS

| | | |
|---|---|---|
| JP | 2006015625 A | 1/2006 |
| JP | 2007087002 A | 4/2007 |
| JP | 2007105937 A | 4/2007 |
| JP | 2008141339 A | 6/2008 |

OTHER PUBLICATIONS

Japanese Office Action issued in Japanese application No. JP2013-062848 which is a divisional of basic Japanese counterpart. Dated Nov. 1, 2013.

* cited by examiner

JOB STATUS

| RECEIPT NUMBER | DATE AND TIME | DESTINATION | STATUS |
|---|---|---|---|
| 2886 | 2007/06/10 16:20:35 | 03XXXXXXXX | OK |
| 2884 | 2007/06/10 16:18:11 | 044XXXXXXX | OK |
| 2883 | 2007/06/10 15:59:03 | 03XXXXXXXX | OK |
| 2882 | 2007/06/10 15:44:10 | 044XXXXXXX | NG |
| 2881 | 2007/06/10 15:05:29 | 03XXXXXXXX | OK |
| 2880 | 2007/06/10 14:49:00 | 044XXXXXXX | OK |

◀ 1/4 ▶

1402

DETAIL

| COPY | PRINT | COOPERATIVE FAX |

CLOSE

F I G. 15

| RECEIPT NUMBER | STATUS | COMPLETION STATUS | DATE AND TIME | DESTINATION | OWNER |
|---|---|---|---|---|---|
| 2801 | | OK | 2007/05/15 20:27:15 | 03XXXXXXXXX | tanaka |
| 2802 | | OK | 2007/05/15 16:01:58 | 03XXXXXXXXX | kobayashi |
| 2885 | | OK | 2007/06/10 15:55:11 | 03XXXXXXXXX | tanaka |
| 2887 | | OK | 2007/06/10 16:20:35 | 03XXXXXXXXX | ikeda |
| 2889 | NOW RUNNING | | 2007/06/10 16:27:35 | 03XXXXXXXXX | kobayasi |
| 2890 | STANDBY | | 2007/06/10 16:29:01 | 044XXXXXXXX | ikeda |

| RECEIPT NUMBER | STATUS | COMPLETION STATUS | DATE AND TIME | DESTINATION | SOURCE |
|---|---|---|---|---|---|
| 0001 | | OK | 2006/07/15 22:07:15 | 03XXXXXXXXX | 10.20.1 46.100 |
| 0002 | | OK | 2006/07/16 08:30:47 | 03XXXXXXXXX | 10.20.1 46.100 |
| 2889 | NOW RUNNING | | 2007/06/10 16:27:35 | 03XXXXXXXXX | 10.20.1 46.101 |
| 2890 | STANDBY | | 2007/06/10 16:29:01 | 044XXXXXXXX | 10.20.1 46.101 |

INFORMATION PROCESSING SYSTEM, INFORMATION PROCESSING APPARATUS, INFORMATION PROCESSING METHOD, AND PROGRAM THEREFOR

BACKGROUND OF THE INVENTION

1. Field of the Invention

The present invention relates to a technique in which a plurality of information processing apparatuses cooperatively performs processing.

2. Description of the Related Art

Recently, techniques have been suggested to connect a plurality of information processing apparatuses through a network so that processing (or a job) is performed cooperatively.

For instance, one of the known techniques is that a simple information processing apparatus that has only a read function and no FAX function and an information processing apparatus that has a FAX function are connected through a LAN so that a document read by the simple information processing apparatus is transmitted by facsimile, using the information processing apparatus having the FAX function. Thus, a read job performed by a source information processing apparatus and a FAX transmission job performed by a destination information processing apparatus are combined and performed as a cooperative job. In this way, by a plurality of information processing apparatuses cooperatively performing a cooperative job through a network, convenience for users can be enhanced (see Japanese Patent Laid-Open No. 08-307627). However, since, when performing a cooperative job, an operator is on the source information processing apparatus side, there is a possibility that any other user on the destination information processing apparatus side may accidentally perform an operation such as cancelling the cooperative job or the like.

The present invention is intended to avoid such inconvenience as unintentional manipulations of a job within a system where job processing is performed by cooperation of a plurality of information processing apparatuses.

SUMMARY OF THE INVENTION

According to one aspect of the present invention, an information processing system in which a source information processing apparatus is capable of performing a job cooperatively with a destination information processing apparatus, comprising: an instruction unit configured to cause the source information processing apparatus to submit a cooperative job to the destination information processing apparatus; and a control unit configured to restrict manipulation of the submitted cooperative job at the destination information processing apparatus and to enable the manipulation of the cooperative job according to an instruction from the source information processing apparatus.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 14 shows an exemplary screen displayed according to the exemplary embodiment.

FIG. 15 shows an overview of job information according to the exemplary embodiment.

FIG. 16 shows an overview of job information according to the exemplary embodiment.

DESCRIPTION OF THE EMBODIMENTS

Figure 1:
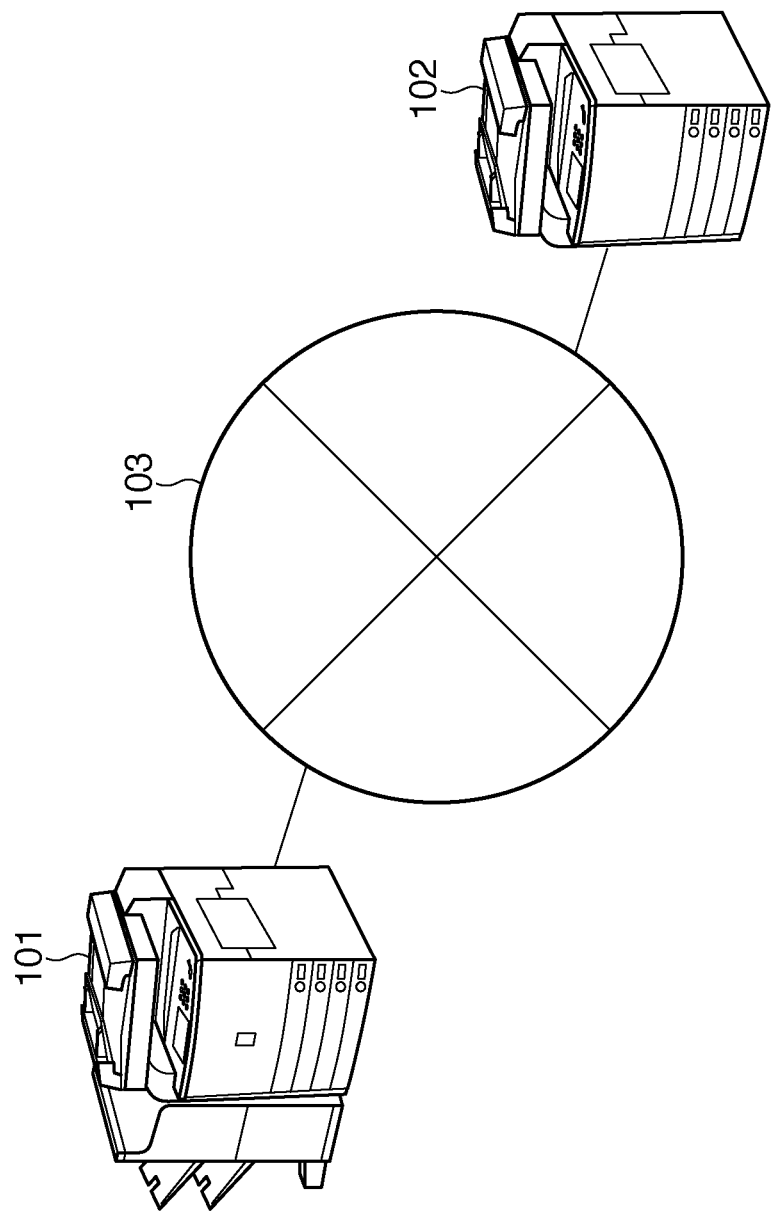
FIG. 1 is a schematic diagram showing a configuration of an information processing system according to an exemplary embodiment.

Referring now to the drawings, an exemplary embodiment of the present invention is illustratively described in detail. It is, however, noted that those components described in the present exemplary embodiment are only illustrative and not intended to limit the scope of the present invention.

An exemplary embodiment of the present invention is described with reference to FIGS. 1 to 22. While the present exemplary embodiment describes an MFP (Multi Function Peripheral) as an example of an information processing apparatus, the present invention is not limited thereto and is also applicable to various types of apparatuses that perform information processing cooperatively with any other apparatus through a network.

With a system according to the present exemplary embodiment, when authentication processing is performed only by a source information processing apparatus and not by a destination information processing apparatus during cooperative job processing, only the source information processing apparatus is allowed to refer to or manipulate a job.

Apparatus Configuration

FIG. 1 is a schematic view showing a configuration of an information processing system according to the present exemplary embodiment. This information processing system is configured by connecting MFPs 101 and 102, which are information processing apparatuses, through a network 103.

The MFP 101 is a digital multifunction peripheral that is equipped with not only print and copy functions but also with a FAX function. These functions can be used for both local jobs (non-cooperative jobs) that are processed by the MFP 101 itself without cooperation with any other MFP and cooperative jobs that are processed in cooperation with other MFPs. Examples of such local jobs include printing by the MFP 101 itself, local copying, a FAX transmission of image data scanned by its own scanner, and the like. The MFP 101 serves as a destination information processing apparatus that performs a cooperative job under instructions from other MFPs. Note that the MFP 101 does not have an authentication management function or that the MFP 101 performs authentication management with a user group other than the MFP 102.

The MFP 102 is a digital multifunction peripheral that is equipped with only print and copy functions and not with a FAX function (FAX transmission-reception function). These functions can be used for both local jobs (non-cooperative jobs) performed by the MFP 102 itself without cooperation with any other MFP and cooperative jobs performed in cooperation with other MFPs. The MFP 102 serves as a source information processing apparatus that submits a cooperative job to other MFPs. The MFP 102 has an authentication management function (which is a function to manage predetermined users and enable the use of the apparatus by authentication of these users); therefore, only an authenticated and logged-in user is allowed to use the MFP 102. Alternatively, when no authentication processing is performed, the use of the apparatus may be allowed, but with restrictions on available functions.

Figure 2:
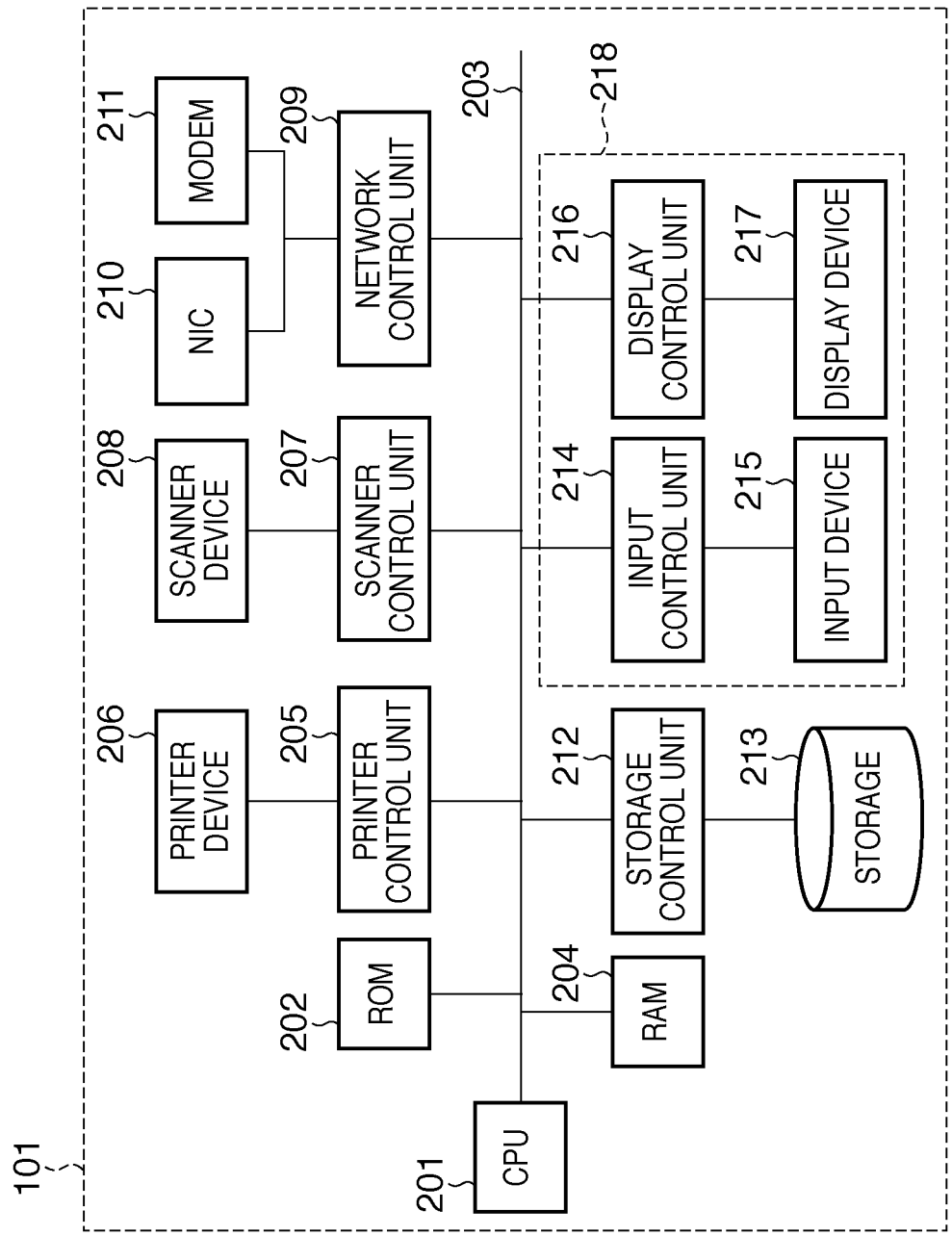
FIG. 2 is a block diagram showing a configuration of an information processing apparatuses according to the exemplary embodiment.

FIG. 2 is a block diagram showing the configuration of the MFP 101. A CPU 201 is a controller for performing overall control over the MFP 101. The CPU 201 activates an OS (Operating System) with a boot program stored in a ROM 202. A controller program and a variety of application programs (APs) stored in a storage 213 are executed on this OS. The CPU 201 is connected to each unit through a bus such as a data bus 203.

A RAM 204 serves as a temporary storage area such as a main memory, a work area, or the like of the CPU 201. The RAM 204 is also used as a temporary data storage area at the time of image data conversion processing or the like.

A printer control unit 205 controls a printer device 206 so that image data is printed on paper or the like. The printer device 206 prints image data as an image on a sheet of paper. The printing method may be any one of various types of printing methods such as an electrophotographic printing method using a photosensitive drum, a photosensitive belt, or the like, an ink-jet printing method in which inks are injected from an array of micro nozzles so that an image is printed directly on paper, and the like.

A scanner control unit 207 controls a scanner device 208 so as to acquire image data. The scanner device 208 scans over an original or any other paper with an optical reader, such as a CCD or the like, and converts image information on the original into electric signal data.

A network control unit 209 controls a network interface (I/F) such as an NIC (Network Interface Card) 210 so that image data and a variety of other data are transmitted to or received from a network such as a LAN. The network control unit 209 also controls a modem 211 to transmit or receive an image to or from a telephone line, thereby providing a FAX function.

The storage 213 is a nonvolatile memory that can read from or write on an HDD or the like, and stores a variety of data such as a controller program for use in overall control of the system, a variety of application programs (APs), scanned image data, and the like. The storage control unit 212 has control over the storage 213.

An input control unit 214 inputs user commands with an input device 215 such as a touch panel or hard keys. A display control unit 216 controls a display device 217 such as an LCD or a CRT so as to display operation screens to users. An operation unit 218 comprises the input control unit 214, the input device 215, the display control unit 216, and the display device 217.

The MFP 102 is almost the same in configuration to the MFP 101 but is not equipped with the modem 211. Also, the storage 213 of the MFP 102 stores, in addition to the above-described variety of data, user IDs and passwords that constitute user authentication information.

Figure 3:
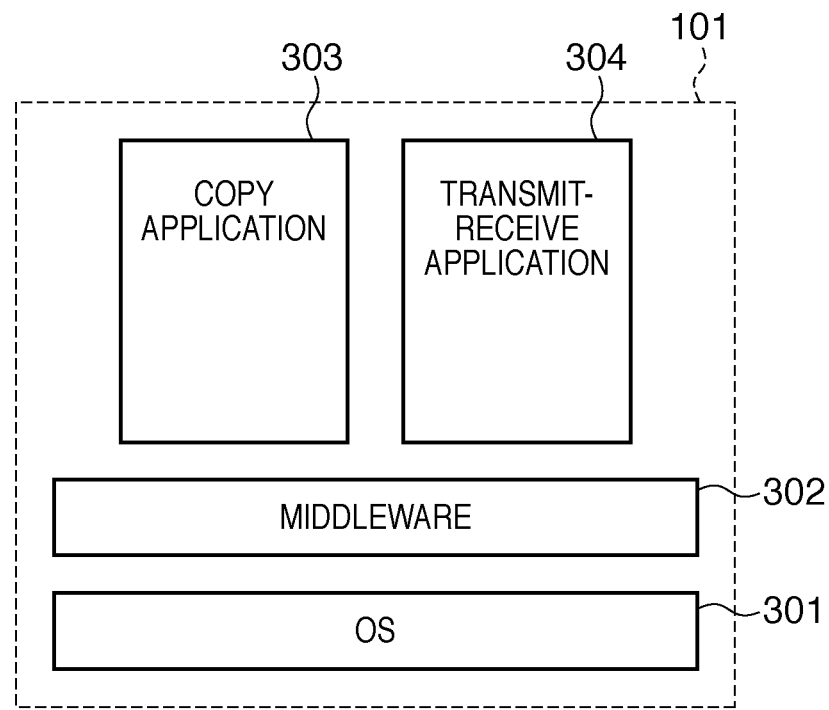
FIG. 3 is a block diagram showing the outline of a software configuration of an information processing apparatus according to the exemplary embodiment.

FIG. 3 is a block diagram showing the outline of the software configuration of the MFP 101. A middleware 302 is configured on an OS 301. The middleware 302 provides APIs for use in operating each device via each control unit, such as an API for use in operating a printer device via a printer control unit.

A copy application 303 is an application that provides users with the copy function, using an API provided by the middleware 302. A transmit-receive application 304 is an application that provides users with the function of transmitting and receiving documents such as facsimiles or e-mails, using an API provided by the middleware 302.

Figure 4:
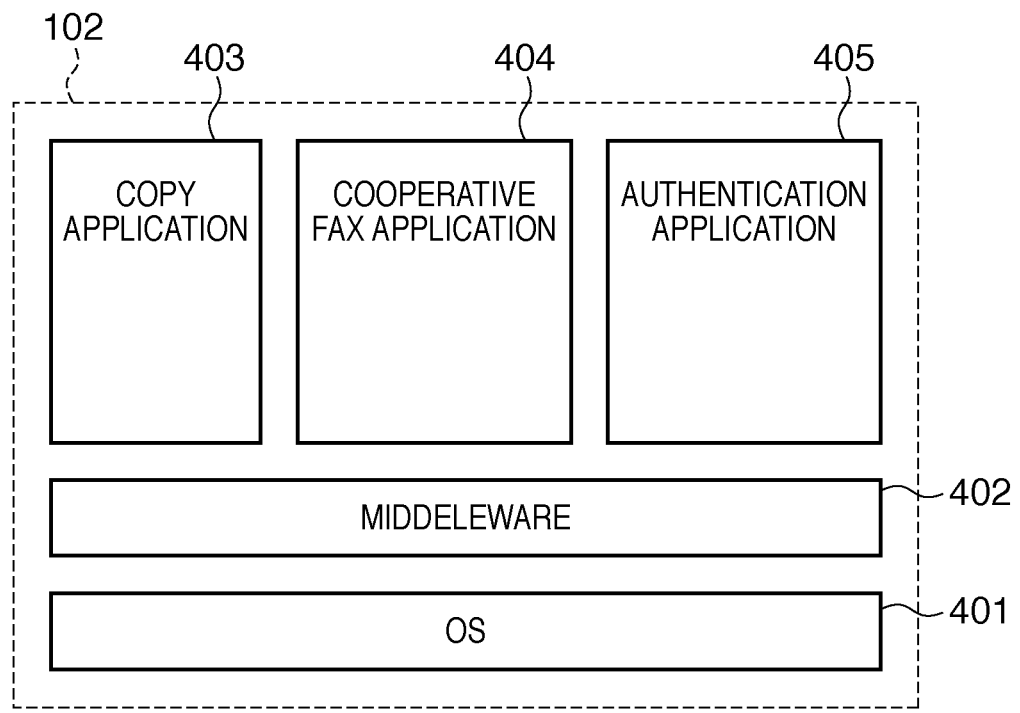
FIG. 4 is a block diagram showing the outline of a software configuration of another information processing apparatus according to the exemplary embodiment.

FIG. 4 is a block diagram showing the outline of the software configuration of the MFP 102. An OS 401, a middleware 402, and a copy application 403 have similar functions to the OS 301, the middleware 302, and the copy application 303 in FIG. 3 and they operate in a similar manner.

A cooperative FAX application 404 is an application that provides users with the FAX transmission function in cooperation with the MFP 101. The MFP 102 itself does not have a FAX transmission function. However, by combining the document scanning by the scanner device 208 of the MFP 102 and the document transmission by the modem 211 of the MFP 101, the MFP 102 virtually behaves as an information processing apparatus having a FAX transmission function. In other words, by performing a cooperative job that is a combination of a scan job performed by the MFP 102 and a FAX transmission job performed by MFP 101, the MFP 102 behaves as if it performs FAX transmission of scanned data by only itself. Although the MFP 102 itself does not have a FAX transmission-reception function, this cooperative FAX application 404 allows the MFP 102 to display an operation screen for requesting a FAX transmission to other MFPs.

An authentication application 405 is an application that provides users with an authentication function. Using an API provided by the middleware 302, the authentication application 405 matches a user ID and a password, which are input by a user through the input device 215, with the authentication information stored in the storage 213. Thereby, the authentication application 405 performs authentication processing in order to find proper users.

Procedure for Entire System

Figure 17:
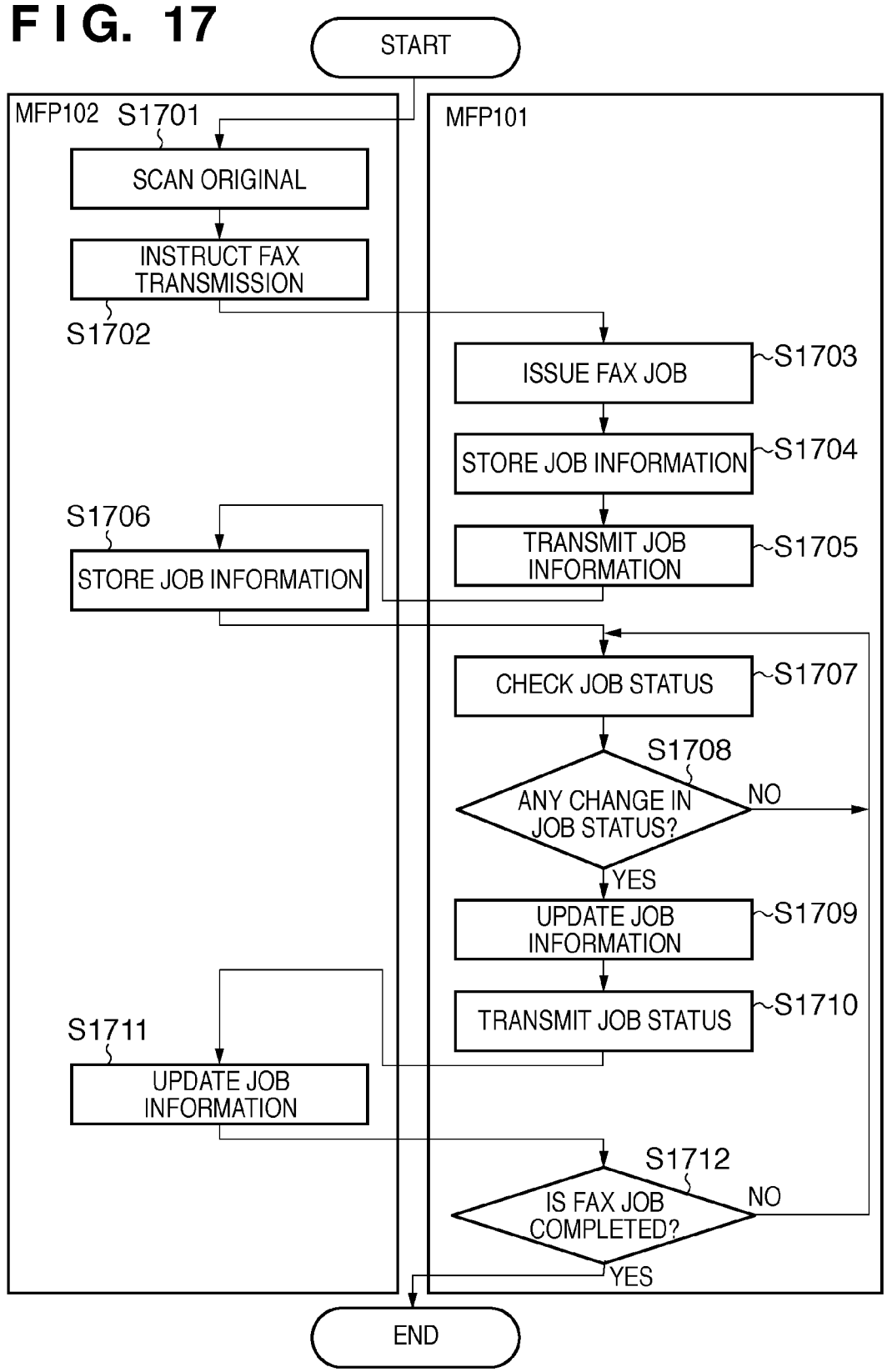
FIG. 17 is a flow chart showing the procedure according to the exemplary embodiment.

Next, a procedure for performing processing such as display or manipulations of a cooperative job is described. FIG. 17 is a process flow chart showing the procedure for submitting a FAX job from the MFP 102 to the MFP 101. This flow chart shows a control procedure where the CPU 201 of each MFP loads a program stored in the ROM 202 or the storage 213 to the RAM 204 and executes the program.

First, the MFP 102 sequentially displays screens shown in FIGS. 5 to 9 on the display device 217 in the operation unit 218, accepts a user's log-in operation, performs authentication, sets image scanning parameters, and specifies a transmission destination (final destination).

Figure 5:
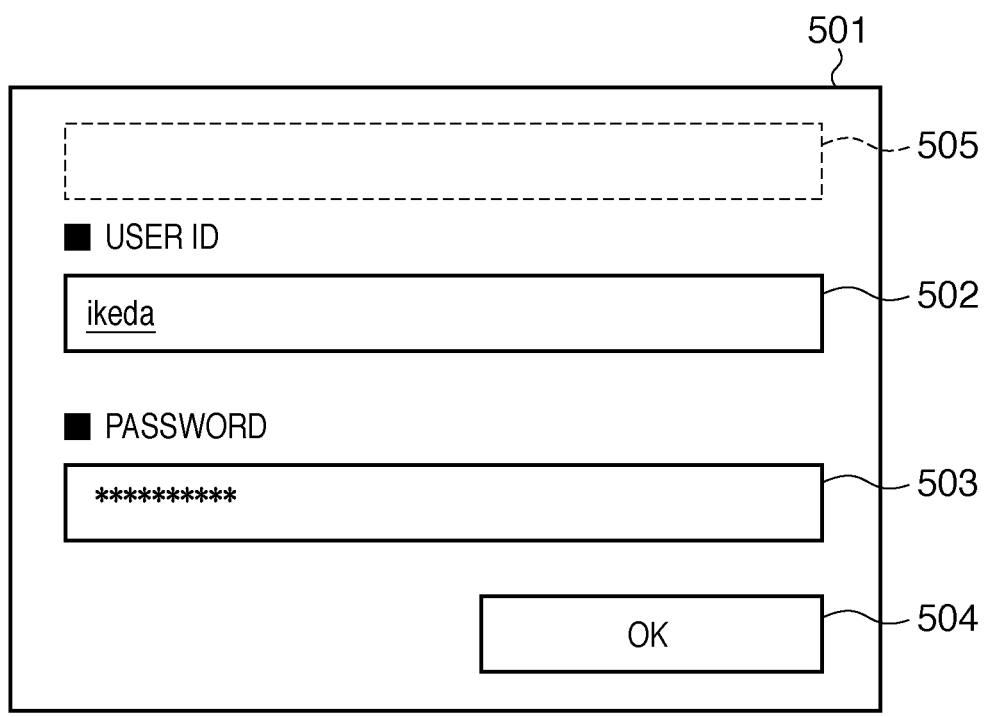
FIG. 5 shows an exemplary screen displayed according to the exemplary embodiment.
Figure 6:
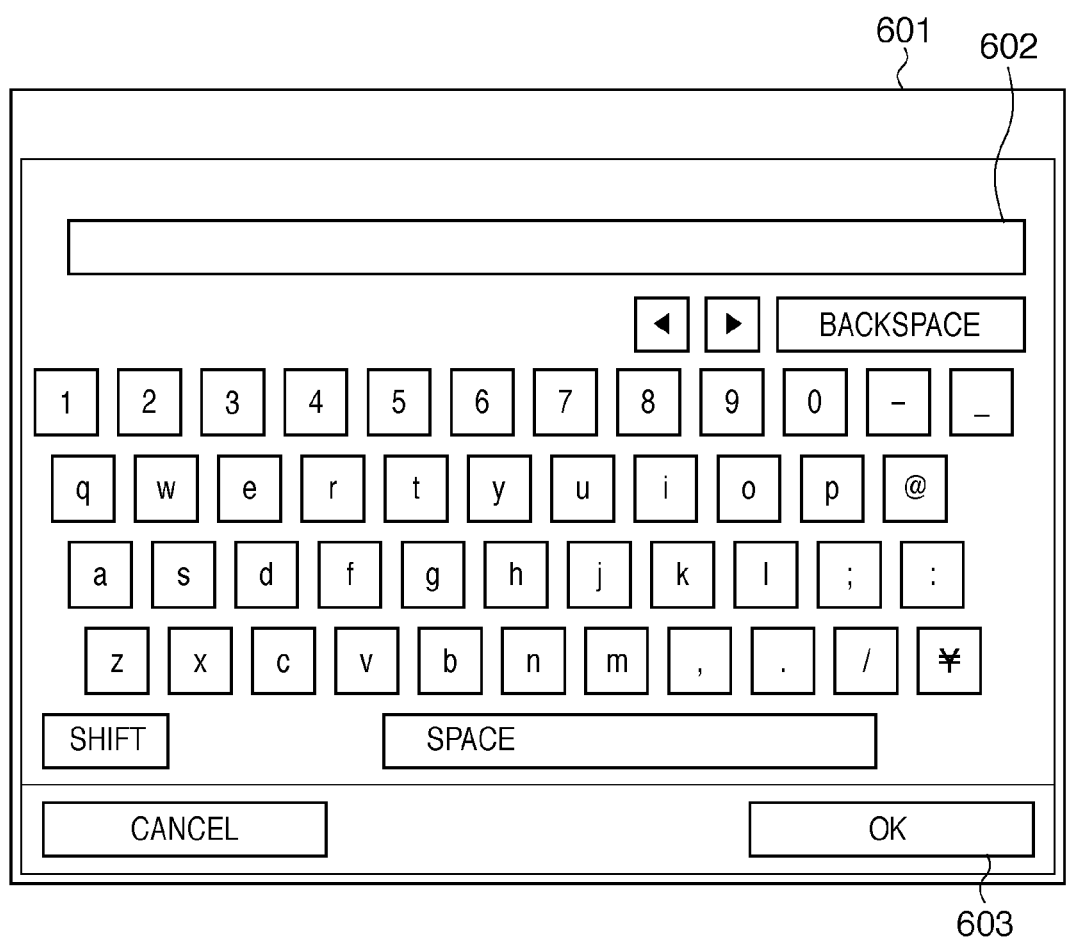
FIG. 6 shows an exemplary screen displayed according to the exemplary embodiment.

FIG. 5 shows a screen 501 for accepting inputs of a user ID and a password and performing user authentication. This screen 501 is displayed under the control of the authentication application 405. On the screen 501, a user-ID input field 502 is a field for inputting a user ID; when this user-ID input field 502 is specified, a software keyboard 601 shown in FIG. 6 is displayed. The input of a user ID is performed by user's operation with the keys on the software keyboard 601. The input contents are displayed in an input-character-string display label 602. When an OK button 603 is specified, the software keyboard window is closed, reflecting the input contents displayed in the user-ID input field 502.

A password input field 503 is a field for inputting a password associated with the user ID input in the user-ID input field 502. When the password input field 503 is specified, the software keyboard 601 is displayed for inputting a password, as in the case where the user-ID input field 502 is specified. However, in the password input field 503 and in the input character string display label 602 displayed on the software keyboard 601 at the time of specifying the password input field 503, the same number of asterisks (*) as the number of input characters are displayed so as to mask the input contents.

Upon selection of an OK button 504, the authentication application 405 accepts the inputs of the user-ID input field 502 and the password input field 503, and the process goes to authentication processing. When the user authentication has failed, the authentication application 405 displays an error message, such as "Wrong Input Information," in a message label 505.

Figure 7:
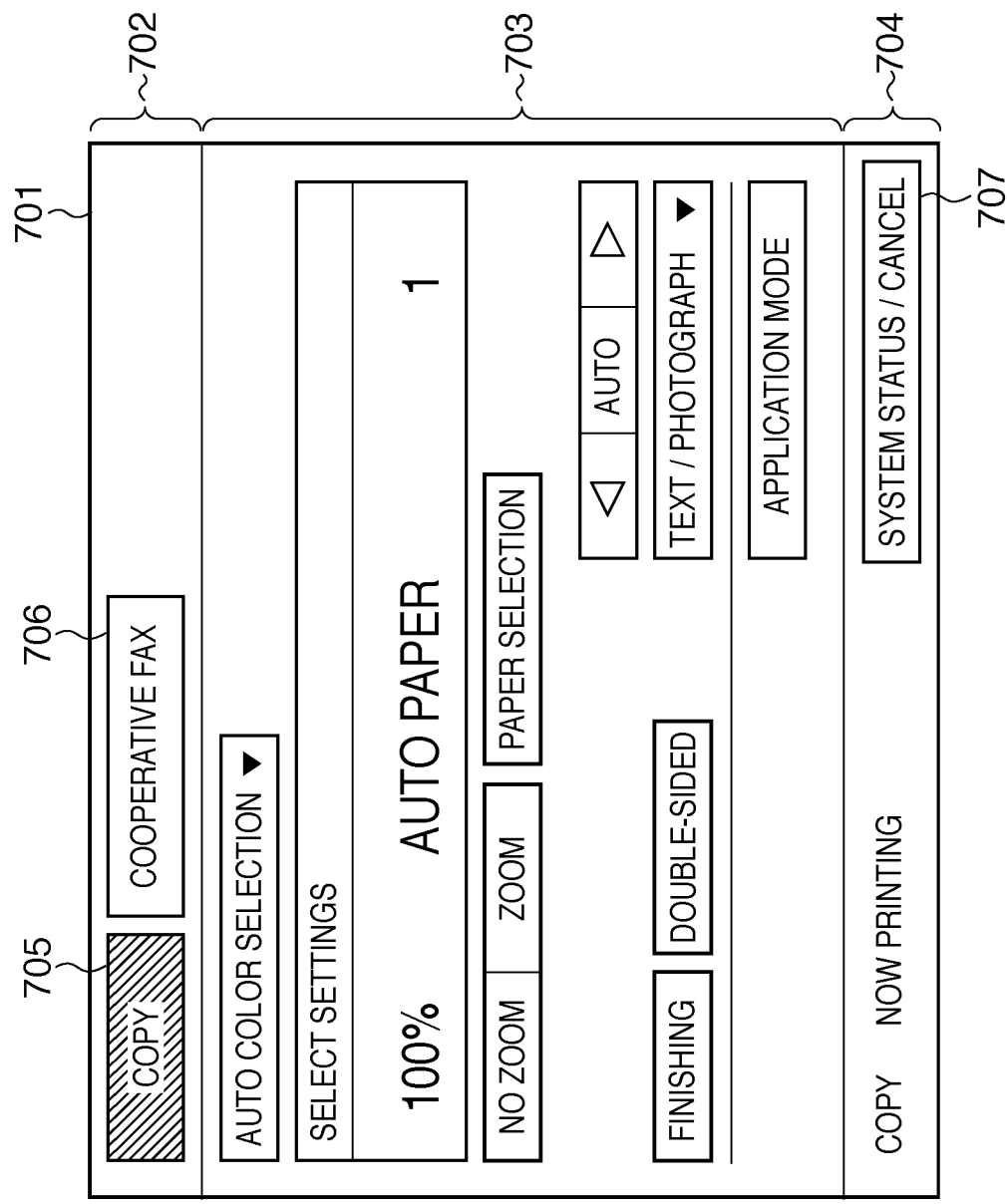
FIG. 7 shows an exemplary screen displayed according to the exemplary embodiment.
Figure 8:
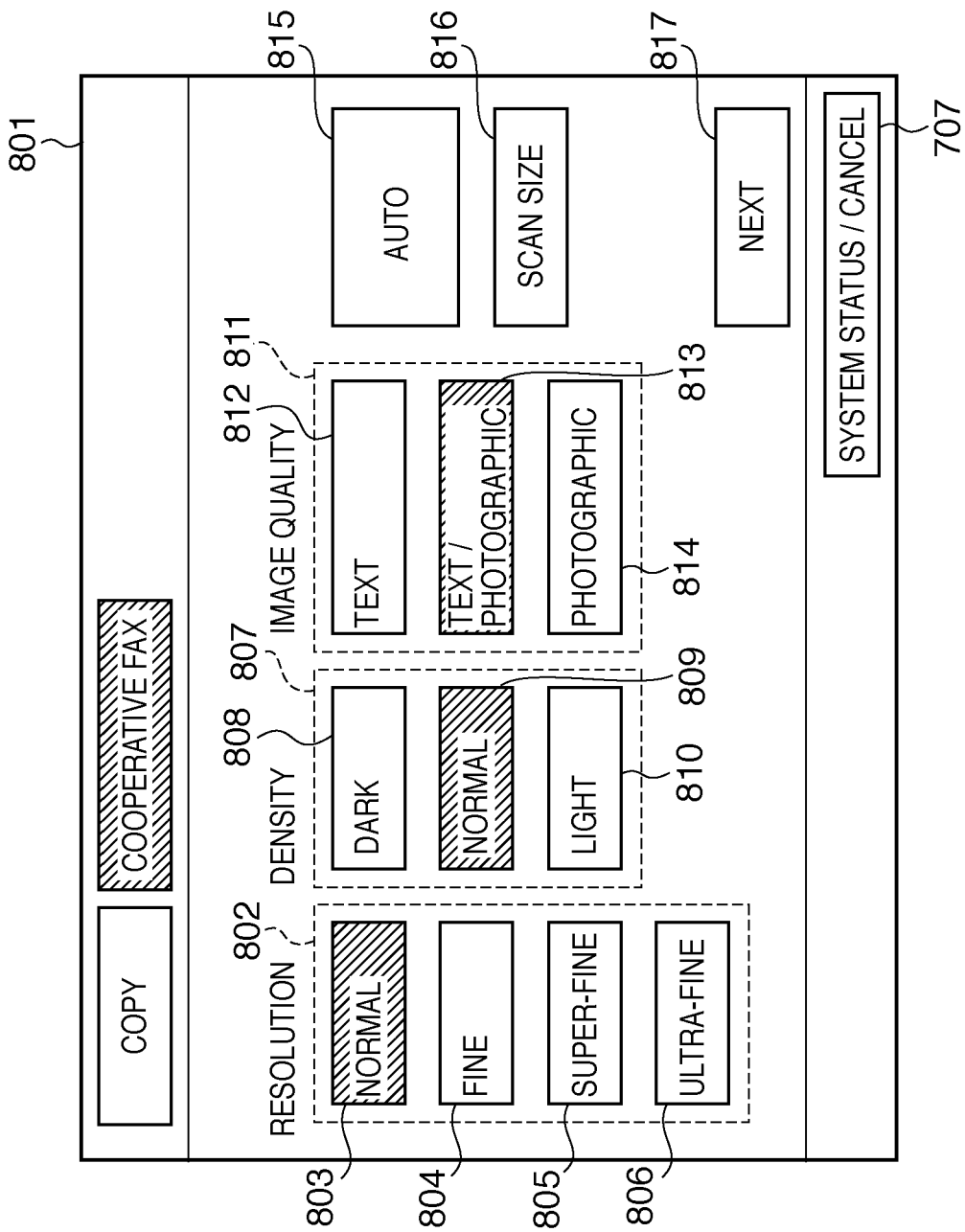
FIG. 8 shows an exemplary screen displayed according to the exemplary embodiment.

On the other hand, when the authentication has passed, the screen transitions to another screen 701 in FIG. 7. The screen 701 can be divided into three areas: a tab area 702, an application area 703, and a status display area 704. The tab area 702 displays tabs that indicate what application is installed.

A copy tab 705 is a tab used to select the copy application 403. Upon selection of the copy tab 705, the copy tab 705 is displayed inverted as shown in FIG. 7, indicating that the copy application 403 is being selected.

The application area 703 displays a screen for use in the application selected in the tab area 702. FIG. 7 shows that the copy application 403 is being selected. The status display area 704 displays a character string that indicates the status of a device or of a job currently being performed.

A cooperative FAX tab 706 is specified to select the cooperative FAX application 404. Upon selection of the cooperative FAX tab 706, the inverted display of the copy tab 705 is cancelled, and instead the cooperative FAX tab 706 is displayed inverted. Then, the screen (a screen 801 in FIG. 8) of the cooperative FAX application 404 is displayed in the application area 703.

The screen 801 is a screen for specifying the settings for the process of scanning an original, performed by the MFP 102. A resolution selection area 802 is an area to select the resolution of scanning an original. Upon selection of a standard button 803, the resolution is set to 200×100 dpi. Upon selection of a fine button 804, the resolution is set to 200×200 dpi. Upon selection of a super-fine button 805, the resolution is set to 200×400 dpi. Upon selection of an ultra-fine button 806, the resolution is set to 400×400 dpi.

A density selection area 807 is an area to select the density of scanning an original. Upon selection of a dark button 808, the density is set so that an original is scanned in a dark color. Upon selection of a normal button 809, the density is set so that an original is scanned in a normal color. Upon selection of a light button 810, the density is set so that an original is scanned in a light color.

An image-quality selection area 811 is an area to select the image quality of scanning an original. Upon selection of a text button 812, the image quality is set so as to scan a text original. Upon selection of a text/photographic button 813, the image quality is set so as to scan an original in which text and photographs are mixed. Upon selection of a photographic button 814, the image quality is set so as to scan a photographic original.

Figure 9:
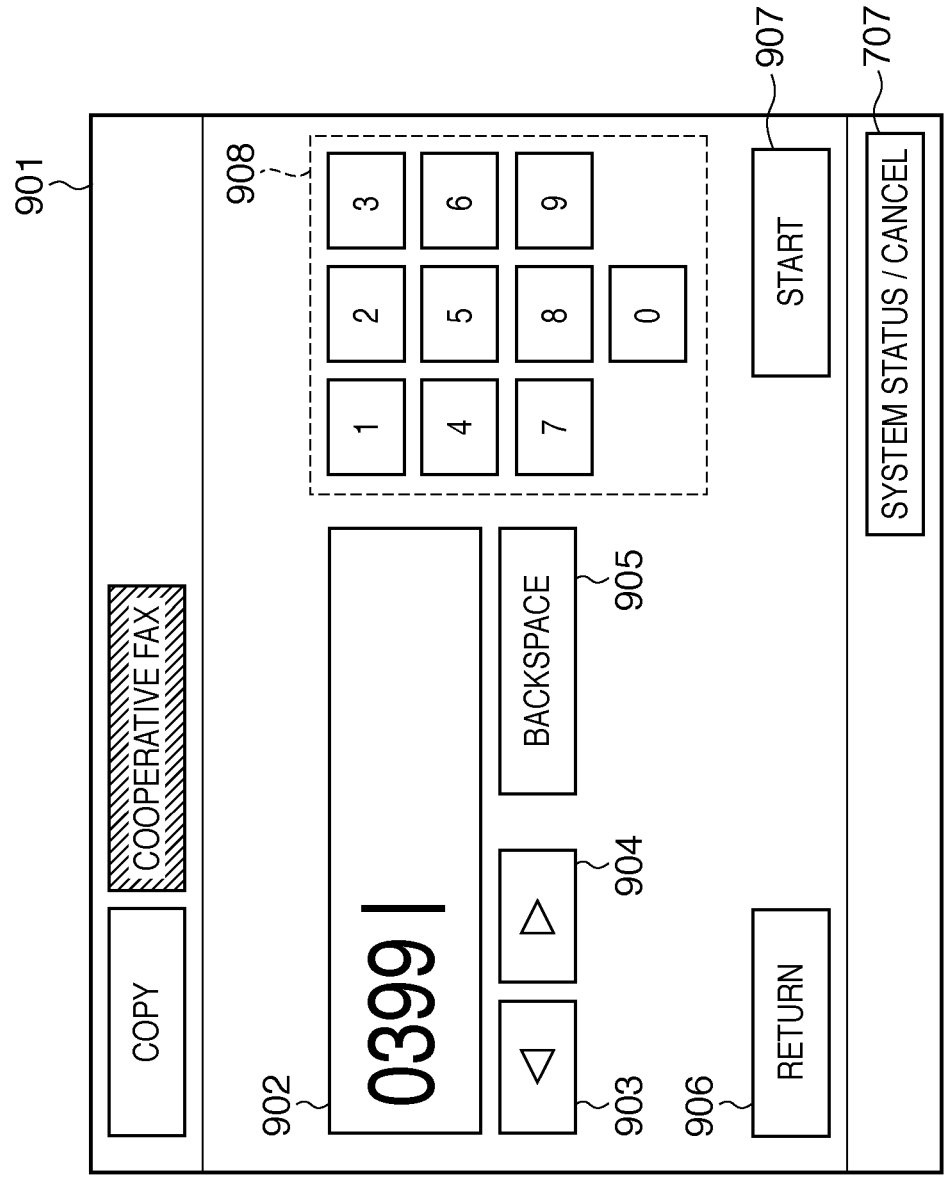
FIG. 9 shows an exemplary screen displayed according to the exemplary embodiment.

A scan size button 816 is used for setting the size of an original. Upon selection of the scan size button 816, a screen (not shown) for setting the size of an original is displayed so that a user can set the size of an original. An original size label 815 displays the size of an original that is set with the scan size button 816. Upon selection of the "next" button 817, the settings on the screen 801 are accepted, and a screen 901 shown in FIG. 9 is displayed.

The screen 901 is a screen for inputting the FAX number of a transmission destination. On the screen 901, a FAX number label 902 displays the FAX number input by a user. The input of a FAX number is given by operation of a numeric keypad 908. The FAX number label 902 displays a caret, and numerical values specified with the numeric keypad 908 are inserted immediately before the caret.

A left button 903 and a right button 904 are used to control the position of the caret. With the press of the left button 903, the position of the caret is shifted one space to the left. With the press of the right button 904, the position of the caret is shifted one space to the right. A backspace button 905 is used to delete a numerical value immediately before (on the left side of) the caret. Upon selection of a return button 906, the screen 801 is displayed.

Figure 10:
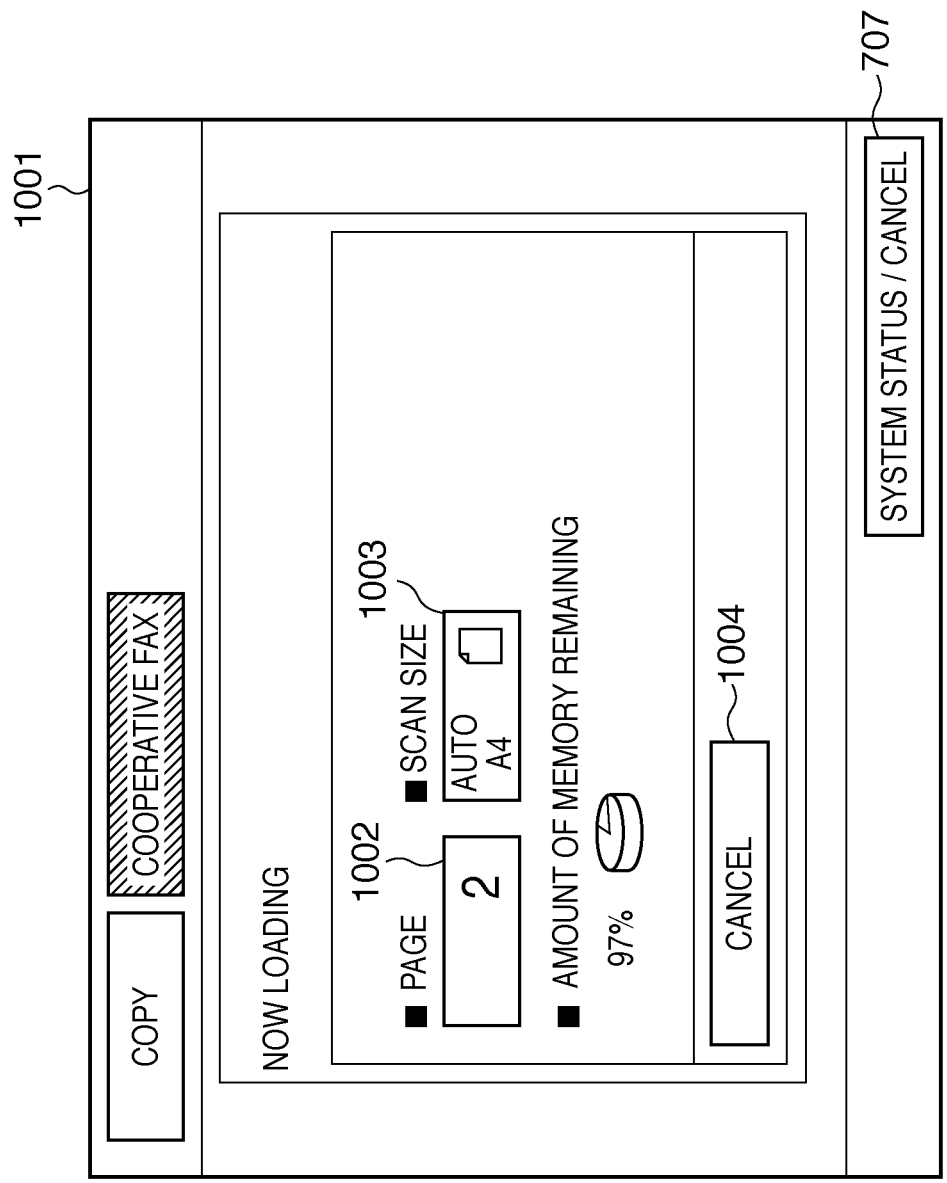
FIG. 10 shows an exemplary screen displayed according to the exemplary embodiment.

Upon selection of a start button 907, the MFP 102 displays a screen 1001 shown in FIG. 10 and scans an image of an original with the scanner device 208 (in step S1701). The scanner device 208 scans an original based on the contents set on the screen 801. The screen 1001 in FIG. 10 is a screen that is displayed during the execution of such an original scanning process. A page label 1002 displays the number of pages of a scanned original, and that number is counted up each time one page of the original is scanned. A scan size label 1003 displays the scan size of an original. The scan size of an original on display is set with the scan size button 816. A cancel button 1004 is used to cancel the original scanning process and a subsequent FAX transmission process. When the cancel button 1004 is specified, the process is cancelled and the screen 801 is displayed again. After the scanning of an original is completed, the screen 1001 is automatically closed and transitions to the screen 801. The CPU 201 of the MFP 102 transmits the scanned document and the FAX transmission settings (FAX number) to the MFP 101 and also serves as an instruction unit that instructs the MFP 101 to perform a cooperative job, that is, FAX transmission. The MFP 101 that is a destination apparatus may be previously stored in the RAM 204 or the like of the MFP 102 or may be selected by a user through the operation unit 218.

Next, the MFP 102 transmits a FAX transmission instruction to the MFP 101 (in step S1702). At this time, the MFP 102 transmits image data obtained by scanning an image of an original in step S1701, set transmission information (FAX number) on the screen 901, and its own IP address to the MFP 101. Note that the MFP 102 may transmit, instead of its own IP address, any other information that enables identification of the MFP 102.

Upon receipt of the FAX transmission instruction from the MFP 102, the MFP 101 transmits the received image data, which is to be transmitted, by FAX through the modem 211 according to the received set information (in step S1703). At this time, the MFP 101 issues a FAX job to which a receipt number is assigned, and stores job information as illustrated in FIG. 16 (in step S1704).

FIG. 16 is a schematic diagram of a job information table 1601 that gives FAX job information stored in the storage 213 of the MFP 101 in a data format. Here, cooperative FAX jobs are distinguished from local FAX jobs (i.e., FAX transmission jobs of transmitting image data scanned with the scanner device 208 of its own) for management.

A receipt number item 1602 represents the receipt number of each FAX job. A status item 1603 represents the status of each FAX job. When the job has not yet been completed, the status item 1603 displays any of the following: "Now Running," "Standby," "Being Cancelled," and "Retry." When the job has been completed, blanks are entered in the status item 1603.

A completion item 1604 indicates whether the FAX job has been completed or not. In the completion item 1604, "OK" is entered when the FAX job has been completed normally, and "NG" is entered when the FAX job has been completed abnormally. When the FAX job has not yet been completed, blanks are entered in the completion item 1604. In a date and time item 1605, the date and time of the receipt of the FAX job by the MFP 101 are entered when the FAX job has not yet been completed; and the date and time of the completion of the FAX job are entered when the FAX job has been completed. A destination item 1606 represents the destination of each FAX job. In a source item 1607, the IP address of an information processing apparatus that has issued the FAX job is entered for identification.

In step S1704, the MFP 101 adds a record to the job information table 1601 and enters the receipt number of the issued FAX job in the receipt number item 1602. The MFP 101 also enters the current date and time in the date and time item 1605 as the date and time of the issuance of the job and enters the IP address received from the MFP 102 in the source item 1607.

After completing the storage of the job information, the MFP 101 then transmits the receipt number issued in step S1703 and the date and time of the issuance of the job to the MFP 102 as the job information (in step S1705).

The MFP 102 stores the received job information as shown in FIG. 15 (in step S1706). FIG. 15 is a schematic diagram showing the outline of a data format in which the FAX job information is stored in the storage 213 of the MFP 102.

A single record in a job information table 1501 corresponds to a single FAX job. A receipt number item 1502 represents the receipt number of each FAX job. A status item 1503 represents the status of each FAX job. When the job has not been completed, the status item 1503 displays any of the following: "Now running," "Standby," "Being Cancelled," and "Retry." When the job has already been completed, blanks are entered in the status item 1503.

A completion item 1504 indicates whether the FAX job has been completed or not. In the completion item 1504, "OK" is entered when the FAX job has been completed normally, and "NG" is entered when the FAX job has been completed abnormally. When the FAX job has not yet been completed, blanks are entered in the completion item 1504. In a date and time item 1505, the date and time of the receipt of the FAX job by the MFP 101 are entered when the FAX job has not yet been completed, and the date and time of the completion of the FAX job are entered when the FAX job has been completed. A destination item 1506 represents the destination of each FAX job. An owner item 1507 represents the user ID of a user who has issued the FAX job. The MFP 102 that performs authentication management manages users who have issued the jobs.

Upon receipt of the job information from the MFP 101, the MFP 102 adds one record to the job information table 1501 and enters the received receipt number in the receipt number item 1502 and the received date and time of the issuance of the job in the date and time item 1505. When a plurality of kinds of destination information processing apparatuses are present, an item that represents destination information processing apparatuses may be added to the job information table 1501, in order to make them identifiable.

The MFP 101 checks the status of the issued FAX job (in step S1707), compares the checked status with the entry in the status item 1603 in the job information table 1601, and determines whether or not any change has occurred in the status of the FAX job (in step S1708). In step S1708, when it is determined that the status of the FAX job has been changed, the MFP 101 updates the status item 1603 in the job information table 1601 (in step S1709). At this time, if the status of the job is "completed," the MFP 101 enters blanks in the status item 1603 and "OK" in the completion item 1604. The MFP 101 also updates the date and time item 1605 with the current date and time. Further, the MFP 101 transmits the status of the FAX job, together with the receipt number of the FAX job and the current date and time, to the MFP 102 (in step S1710).

Upon receipt of the status and the receipt number of the FAX job, the MFP 102 searches the job information table 1501 for the record that matches the received receipt number, and updates the status item 1503 (in step S1711). At this time, when the status of the received job indicates that the job has been completed, the MFP 102 enters blanks in the status item 1503 and "OK" in the completion item 1504. The MFP 102 also updates the date and time item 1505 with the current date and time received from the MFP 101. In step S1708, when it is determined that no change has occurred in the status of the FAX job, the process goes to step S1707 where the MFP 101 again checks the status of the FAX job.

The MFP 101 determines whether the FAX job has been completed or not (in step S1712). In step S1712, when it is determined that the FAX job has been completed, the process is completed. In step S1712, when it is determined that the FAX job has not yet been completed, the process goes to step S1707 where the MFP 101 again checks the status of the FAX job.

Job Status Display in MFP 102

Figure 18:
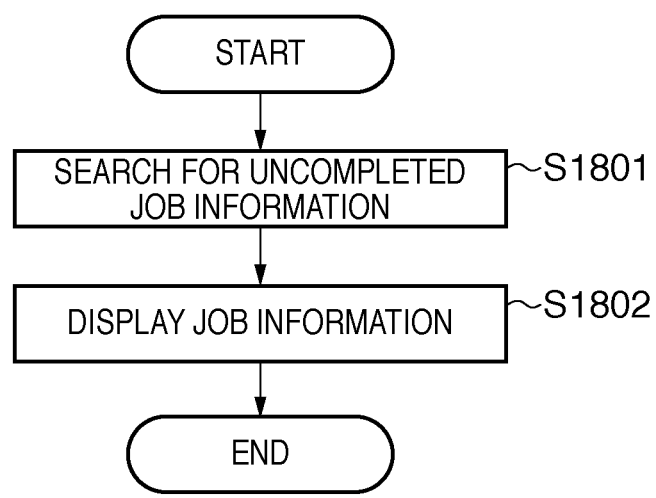
FIG. 18 is a flow chart showing the procedure according to the exemplary embodiment.

In the MFP 102, if any system status/cancel button 707 shown in FIGS. 7 to 10 is selected after the issuance of a job, a screen (a screen 1101 in FIG. 11) that displays the status of a job, a system, or the like is displayed through the process shown in FIG. 18.

FIG. 18 is a process flow chart showing the procedure for displaying the status of a FAX job in the MFP 102. This flow chart shows a control procedure where the CPU 201 of the MFP 102 loads a program stored in the ROM 202 or the storage 213 to the RAM 204 and executes the program. The MFP 102 searches for several records (the number of records depends on how many the screen can display; in the example of FIG. 11, six records at the maximum) that have no entry in the completion item 1504 and the earliest dates and times in the date and time item 1505 in the job information table 1501 (in step S1801). The MFP 102 displays the searched records on the screen 1101 in FIG. 11 (in step S1802).

Figure 11:
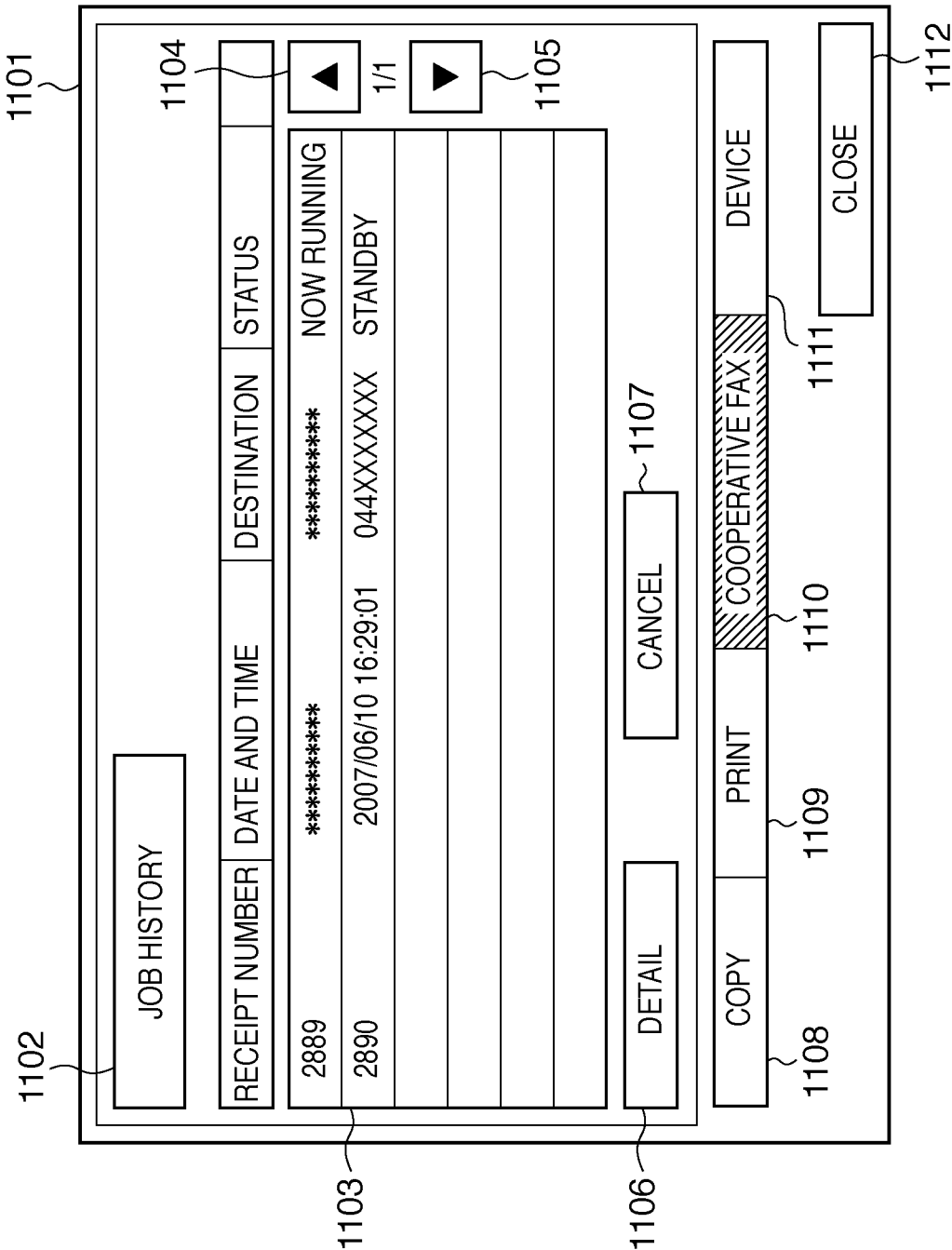
FIG. 11 shows an exemplary screen displayed according to the exemplary embodiment.

Referring to FIG. 11, the screen 1101 is a screen that displays a list of uncompleted FAX jobs (hereinafter referred to as "FAX job statuses") selected from among the FAX jobs submitted from the MFP 102 to the MFP 101. Those FAX job statuses displayed on the screen 1101 are information on the FAX jobs performed by the MFP 101; the MFP 102 receives and displays such FAX job statuses transmitted from the MFP 101.

A job status list 1103 displays the FAX job statuses in a list format. Display items of each FAX job status include the receipt number, the date and time, the destination, and the status. The receipt number is an ID given to each FAX job issued by the MFP 101. The receipt number is a four-digit ID that is incremented by one each time the MFP 101 has issued a FAX job, and it is a rotary ID that returns to its initial value when reaching a maximum. The date and time represents the date and time of the receipt of the FAX job by the MFP 101. The destination represents a transmission destination of the FAX job received by the MFP 101; in the present example, it is a FAX number that is input into the FAX number label 902 by a user. The status represents the status of the FAX job issued by the MFP 101. The status displays any one of the following: "Now running," "Standby," "Being Cancelled," and "Retry." By specifying each line in the job status list, the specified line can be put into a currently selected state. The line currently being selected is displayed inverted.

Specifying an up scroll button 1104 or a down scroll button 1105 causes the display in the job status list 1103 to scroll up or down. When a single page cannot display all of the FAX job statuses, the up scroll button 1104 and the down scroll button 1105 are used to display every FAX.

Specifying a detail button 1106 displays a job-status detail screen (not shown) that displays a currently selected FAX job. The job-status detail screen displays, in addition to the items displayed in the job status list, more detailed information on the FAX job, such as the number of pages of the transmitted document.

Pressing a cancel button 1107 cancels the currently selected FAX job. At this time, the MFP 102 transmits an instruction to cancel the job, together with the receipt number of that job, to the MFP 101. The MFP 101 cancels the job that has the received receipt number.

Pressing a copy button 1108 causes a transition to a screen (not shown) that displays the job status of a copy job performed by the MFP 102 as a local job.

Pressing a print button 1109 causes a transition to a screen (not shown) that displays the job status of a print job performed by the MFP 102 as a local job.

Pressing a cooperative FAX button 1110 causes a transition to the screen 1101 (which displays the status of a cooperative FAX job). In FIG. 11, since the screen 1101 is already being displayed, the cooperative FAX button 1110 is displayed inverted.

Pressing a device button 1111 causes a transition to a screen (not shown) that displays the status of the MFP 102 in itself. On this screen, a user can refer to the statuses of consumables, such as the amount of paper remaining on each paper feed tray, a toner indicator, and the like.

The copy button 1108, the print button 1109, the cooperative FAX button 1110, the device button 1111 are displayed on any screen that is displayed with the pressing of those buttons.

Pressing a close button 1112 causes a transition to either the screen 701 or the screen 801 according to the application currently being selected.

In the job status list 1103, the date and time and the destination of every job that has been submitted by any user other than the currently logged-in user are displayed with masking. Further, if the currently logged-in user selects any job that has been submitted by other users, the detail button 1106 and the cancel button 1107 are shaded on display and cannot be selected. On the other hand, those jobs that have been performed without authentication processing are neither masked nor shaded and thus can be both displayed and manipulated without any restrictions.

Figure 19:
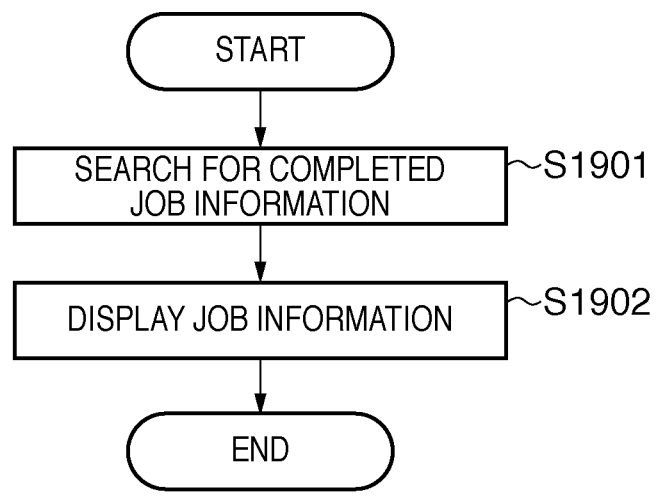
FIG. 19 is a flow chart showing the procedure according to the exemplary embodiment.

When a job history button 1102 is selected on this screen 1101, the process shown in FIG. 19 is performed and the screen transitions to a screen 1201.

Job History Display in MFP 102

FIG. 19 is a process flow chart showing a procedure for displaying a FAX job history in the MFP 102. This flow chart shows a control procedure where the CPU 201 of the MFP 102 loads a program stored in the ROM 202 or the storage 213 to the RAM 204 and executes the program. The screen 1201 in FIG. 12 is a screen that displays a list of completed FAX jobs (hereinafter referred to as FAX job histories) selected from among the FAX jobs submitted from the MFP 102 to the MFP 101.

Figure 12:
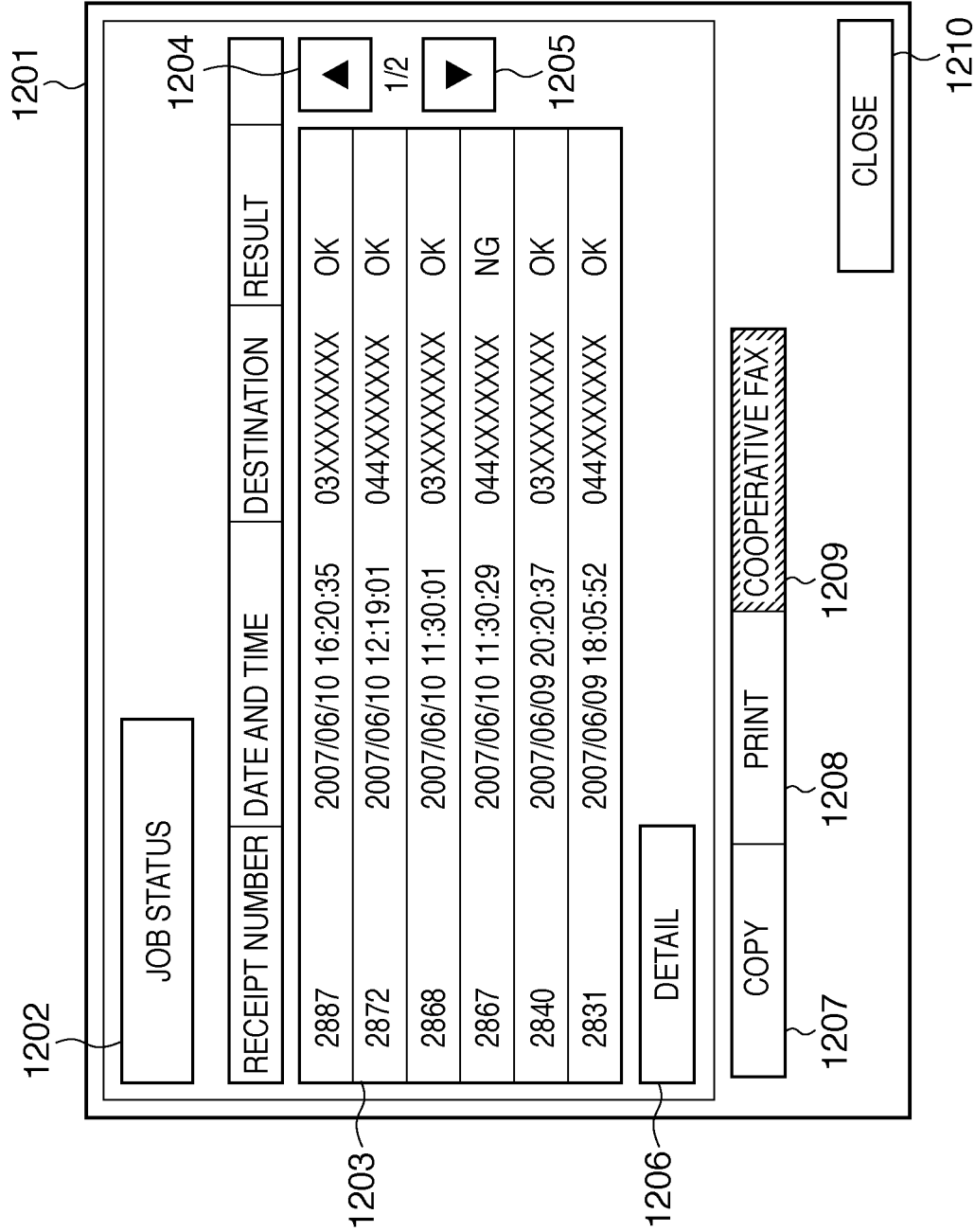
FIG. 12 shows an exemplary screen displayed according to the exemplary embodiment.

The MFP 102 searches for several records (the number of records depends on how many the screen can display; in the example of FIG. 12, six records at the maximum) that contain entries in the completion item 1504 and the latest dates and times in the date and time item 1505 on the job information table 1501 (in step S1901). The MFP 102 displays the searched records on the screen 1201 in FIG. 12 (in step S1902).

Referring to FIG. 12, the job history list 1203 displays FAX job histories. Display items of each FAX job history include the receipt number, the date and time, the destination, and the result. As is the case in the job status list 1103, the receipt number is an ID given to each FAX job issued by the MFP 101. The date and time represents the date and time of the completion of the FAX job by the MFP 101. The destination represents, as is the case in the job status list 1103, a transmission destination of the FAX job completed by the MFP 101. The result represents the result of the FAX job issued by the MFP 101. The result displays either "OK" or "NG" as a result of a corresponding FAX job. The display of "NG" indicates the case that the transmission has failed. Moreover, by selecting each line in the job history list 1203, the selected line can be put into a currently selected state. The line currently being selected is displayed inverted.

Specifying an up scroll button 1204 or a down scroll button 1205 causes the display in the job history list 1203 to scroll up or down. When a single page cannot display all of the FAX job histories, the up scroll button 1204 and the down scroll button 1205 are used to display every FAX job history.

Pressing a detail button 1206 displays a job-history detail screen (not shown) that displays a FAX job history currently being selected in the list. Pressing a copy button 1207 causes a transition to a screen (not shown) that displays the job history of a copy job performed by the MFP 102 as a local job. Pressing a print button 1208 causes a transition to a screen (not shown) that displays the job history of a print job performed by the MFP 102 as a local job. Pressing a cooperative FAX button 1209 causes a transition to the screen 1201 (which displays the history of a cooperative FAX job). In FIG. 12, since the screen 1201 is already being displayed, the cooperative FAX button 1209 is displayed inverted.

The copy button 1207, the print button 1208, and the cooperative FAX button 1209 are displayed on any screen that is displayed with the pressing of those buttons. Pressing a close button 1210 causes a transition to either the screen 701 or the screen 801 according to the application currently being selected. The job history list 1203 displays only those jobs submitted by the currently logged-in user and does not display any jobs submitted by other users.

Note that when a job status button 1202 is selected, the process returns to the step of displaying the screen 1101 in FIG. 11.

Job Status Display in MFP 101

Figure 13:
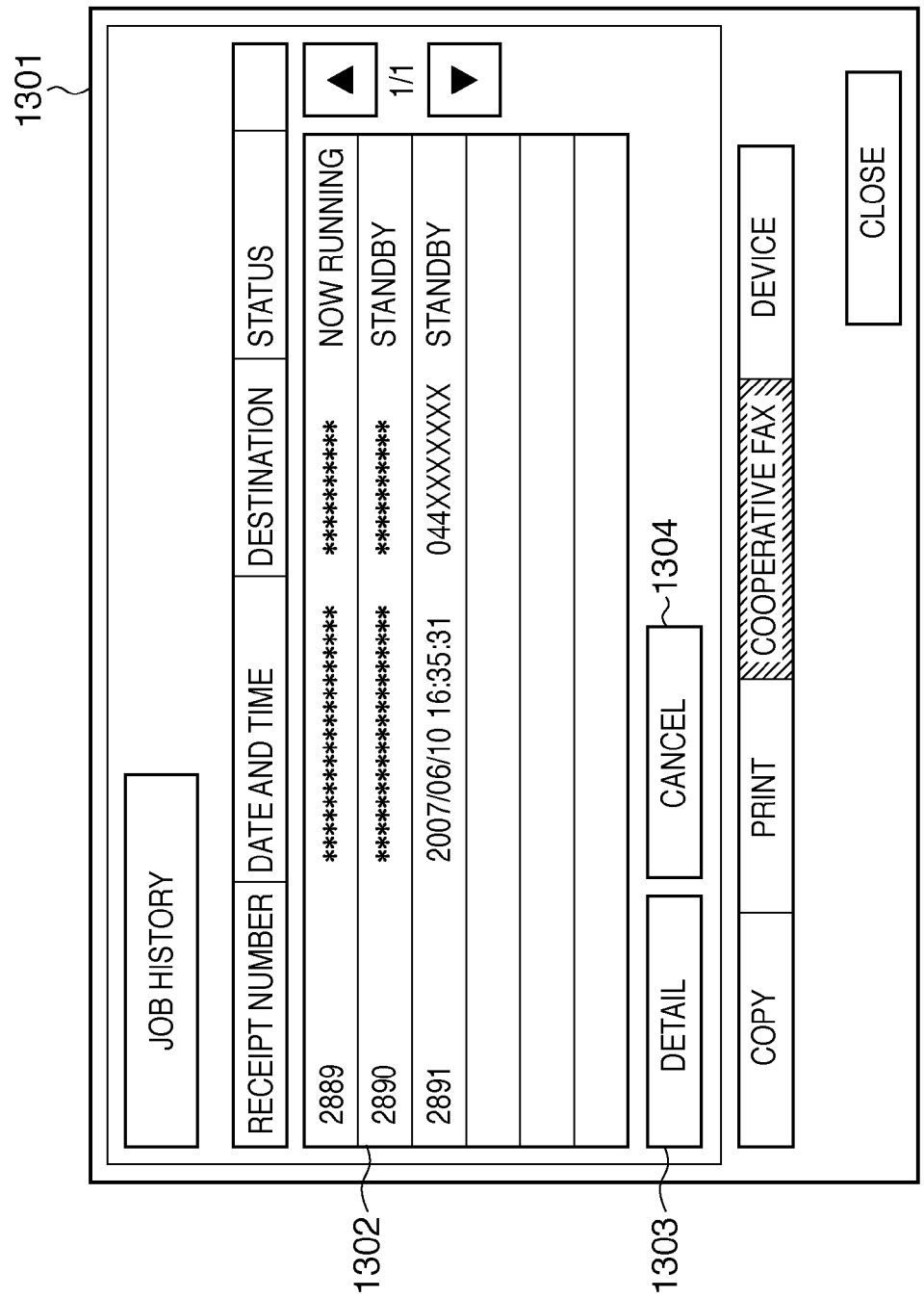
FIG. 13 shows an exemplary screen displayed according to the exemplary embodiment.

FIG. 13 shows a FAX job status screen 1301 in the MFP 101. In FIG. 13, although the display items and contents are similar to those of the screen 1101, a job status list 1302 displays, in addition to local FAX jobs submitted by the MFP 101, cooperative FAX jobs submitted from the MFP 102 and other information processing apparatuses.

In the job status list 1302, the dates and times and the destinations of those jobs that have been submitted from information processing apparatuses such as the MFP 102 that perform user authentication management are displayed with masking. When such jobs are being selected, the detail button 1303 and the cancel button 1304 are shaded on the display and cannot be selected. In other words, as to those jobs submitted from those information processing apparatuses that perform authentication management, neither their statuses are displayed nor any change or manipulation thereof under the control of the operation unit 218 of the MFP 101 is allowed.

That is, the CPU 201 of the MFP 101, when displaying the status of a cooperative job, serves as a control unit that submits an inquiry about whether authentication processing has been performed or not, to the MFP 102 that is a source information processing apparatus. Then, according to the response from the MFP 102 which is a source information processing apparatus, the status of the cooperative job is displayed with masking, with restrictions placed on display of at least part of the information (e.g., the date and time, the destination, or the like).

On the contrary, jobs submitted from such information processing apparatuses that do not perform authentication management are displayed as usual in the job status list 1302, like the jobs submitted from its own (MFP 101). When such jobs are being selected, the detail button 1303 and the cancel button 1304 are also displayed as usual, so that the operation unit 218 of the MFP 101 can submit a variety of job manipulation instructions for manipulation of such jobs.

Figure 20:
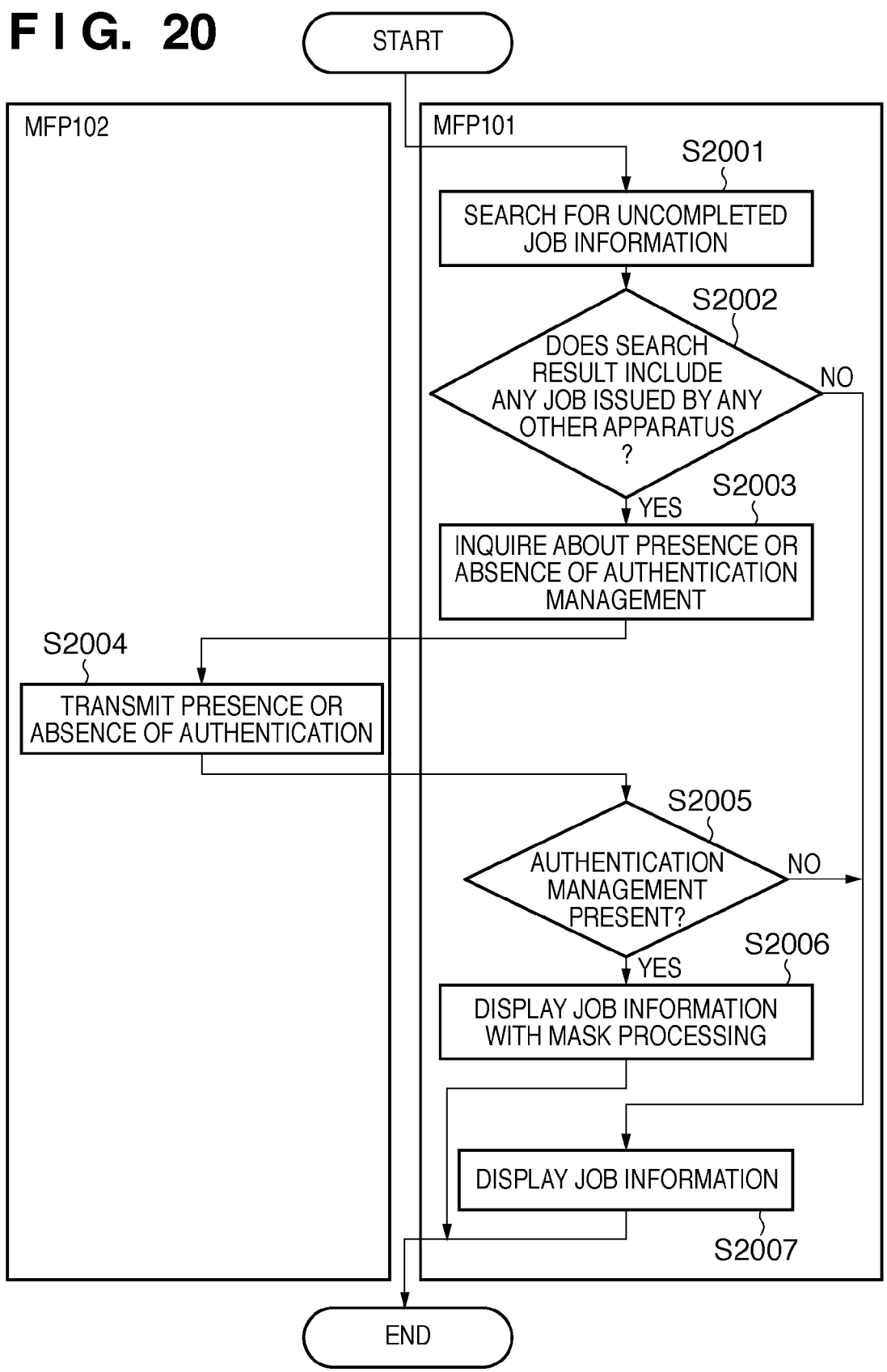
FIG. 20 is a flow chart showing the procedure according to the exemplary embodiment.

FIG. 20 is a flow chart showing a procedure for displaying the FAX job status screen 1301 in the MFP 101. This flow chart shows a control procedure where the CPU 201 of each MFP loads a program stored in the ROM 202 or the storage 213 to the RAM 204 and executes the program. The MFP 101 searches for several records (the number of records depends on how many the screen can display; in the example of FIG. 13, six records at the maximum) that have no entries in the completion item 1604 and the latest dates and times in the date and time item 1605 in the job information table 1601 (in step S2001).

As a result of the search in step S2001, the MFP 101 determines whether or not any of the searched records has an IP address that does not agree with its own IP address, in the source item 1607 (in step S2002). In other words, the presence or absence of any cooperative FAX job submitted from information processing apparatuses other than the MFP 101 is determined. The method of determination is not limited to the method using the IP address.

In step S2002, when the MFP 101 determines that no record stores an IP address that disagrees with the IP address of its own in the source item 1607, the process goes to step S2007.

In step S2002, when the MFP 101 determines that there is a record that stores an IP address that disagrees with the IP address of its own in the source item 1607, the MFP 101 submits an inquiry about the presence or absence of authentication management to the information processing apparatus (MFP 102) that has the IP address stored in the source item 1607 of that record (in step S2003). In other words, the MFP 101 makes an inquiry about whether or not the job in the record has been subjected to user authentication processing before it has been submitted.

The MFP 102 transmits the presence or absence of authentication management to the MFP 101 (in step S2004). In the present exemplary embodiment, the MFP 102 has an authentication management function and performs authentication processing when submitting a cooperative FAX job; therefore, the MFP 102 transmits the response stating "authentication management present."

The MFP 101 determines the presence or absence of authentication management in the MFP 102 according to the result of response (in step S2005). In the presence of authentication management in step S2005, as to those records that store the IP address of the MFP 102 in their source item 1607, the MFP 101 displays their dates and times and their destinations with masking (in step S2006). As to such records displayed in part with masking, any job manipulation, such as cancellation or modification, under instructions from the operation unit 218 of the MFP 101 is inhibited.

In the absence of authentication management in step S2005, the MFP 101 displays records as usual, like those records that store the IP address of the MFP 101 in their source item 1607, that is, local jobs submitted from its own (in step S2007). As to those normally displayed records, any manipulation of the jobs, such as cancellation or modification, under instructions from the operation unit 218 of the MFP 101 are allowed. Additionally, cooperative jobs subjected to authentication management, cooperative jobs not subjected to authentication management, and local jobs are distinguished from one another for display. Thus, a user can easily identify whether manipulation is possible or not according to the type of each job.

Job History Display in MFP 101

FIG. 14 shows a FAX job history screen 1401 that displays FAX job histories in the MFP 101. The display items and contents of the FAX job history screen 1401 are similar to those of the screen 1201. However, a job history list 1402 does not display the histories of jobs that have been submitted from information processing apparatuses (except from its own) such as the MFP 102 that perform user authentication management. The MFP 101 displays, in the job history list 1402, only the histories of jobs submitted from its own or the histories of jobs submitted from information processing apparatuses that have no authentication management function. Alternatively, instead of not displaying the histories of cooperative FAX jobs submitted from information processing apparatuses that perform authentication management at all, the MFP 101 may display some of their items (e.g., destination) with masking.

Figure 21:
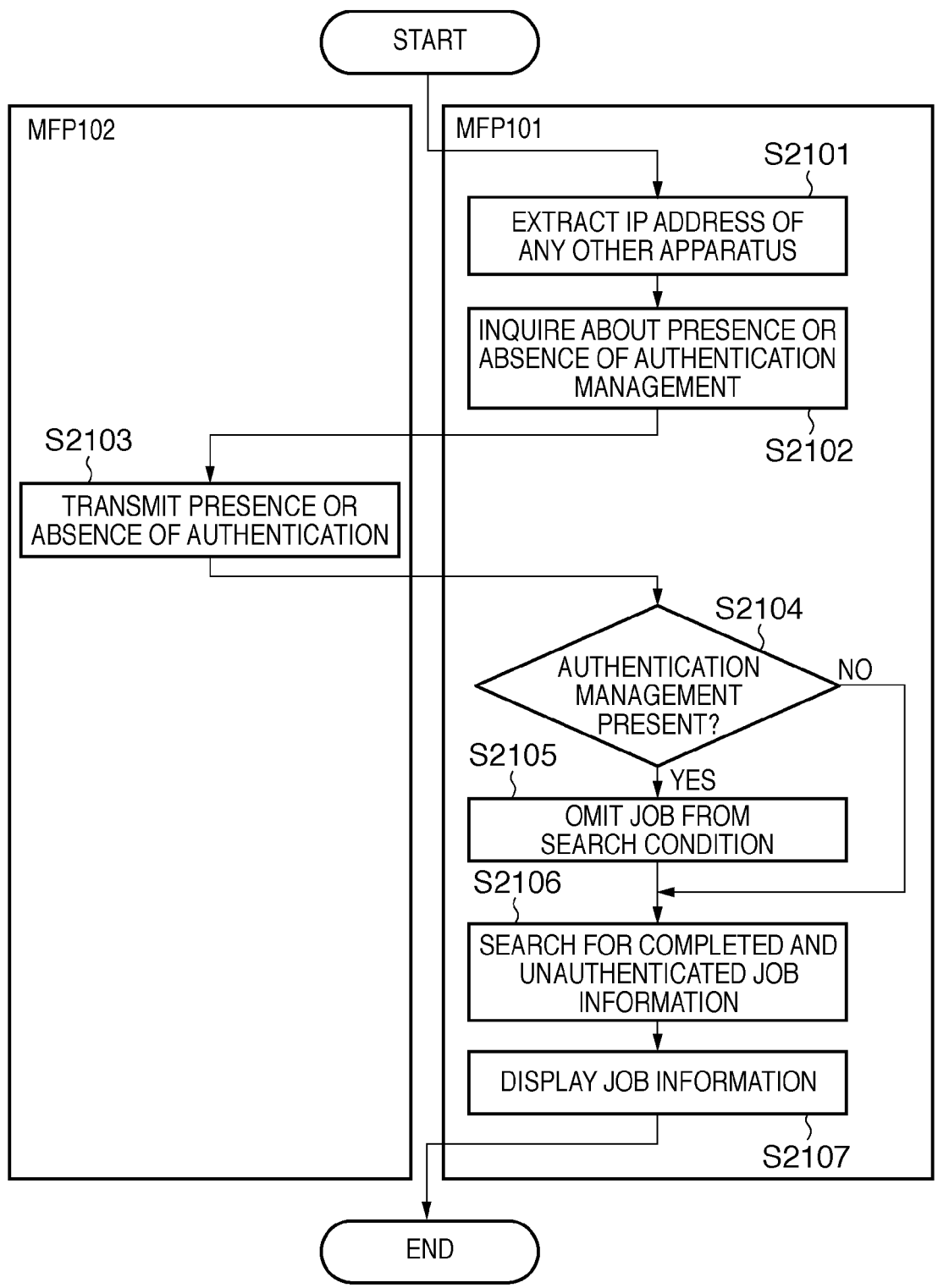
FIG. 21 is a flow chart showing the procedure according to the exemplary embodiment.

FIG. 21 is a flow chart showing a procedure for displaying the FAX job history screen 1401 in the MFP 101. This flow chart shows a control procedure where the CPU 201 of each MFP loads a program stored in the ROM 202 or the storage 213 to the RAM 204 and executes the program.

The MFP 101 extracts all IP addresses other than its own IP address from the source item 1607 in the job information table 1601 (in step S2101). For each of the IP addresses extracted in step S2101, an inquiry about the presence or absence of authentication management is submitted to an information processing apparatus corresponding to that IP address (in step S2102).

The MFP 102, which is one of the information processing apparatuses, transmits the presence or absence of authentication management to the MFP 101 (in step S2103). Since in the present exemplary embodiment, the MFP 102 performs authentication management, the MFP 102 transmits the response stating "authentication management present." From the result of response, the MFP 101 determines whether or not the information processing apparatus of interest performs authentication management (in step S2104). In the absence of authentication management in step S2104, the process goes to step S2106.

In the presence of authentication management in step S2104, the MFP 101 omits the records that store the IP address of interest in their source item 1607, from search targets (in step S2105). On the conditions obtained as a result of step S2104, the MFP 101 searches for several records (the number of records depends on how many the screen can display; in the example of FIG. 14, six records at the maximum) that have entries in the completion item 1604 and the latest dates and times in the date and time item 1605 in the job information table 1601 (in step S2106). The MFP 101 displays the searched records on the FAX job history screen 1401 (in step S2107).

Job Cancellation in MFP 102

Figure 22:
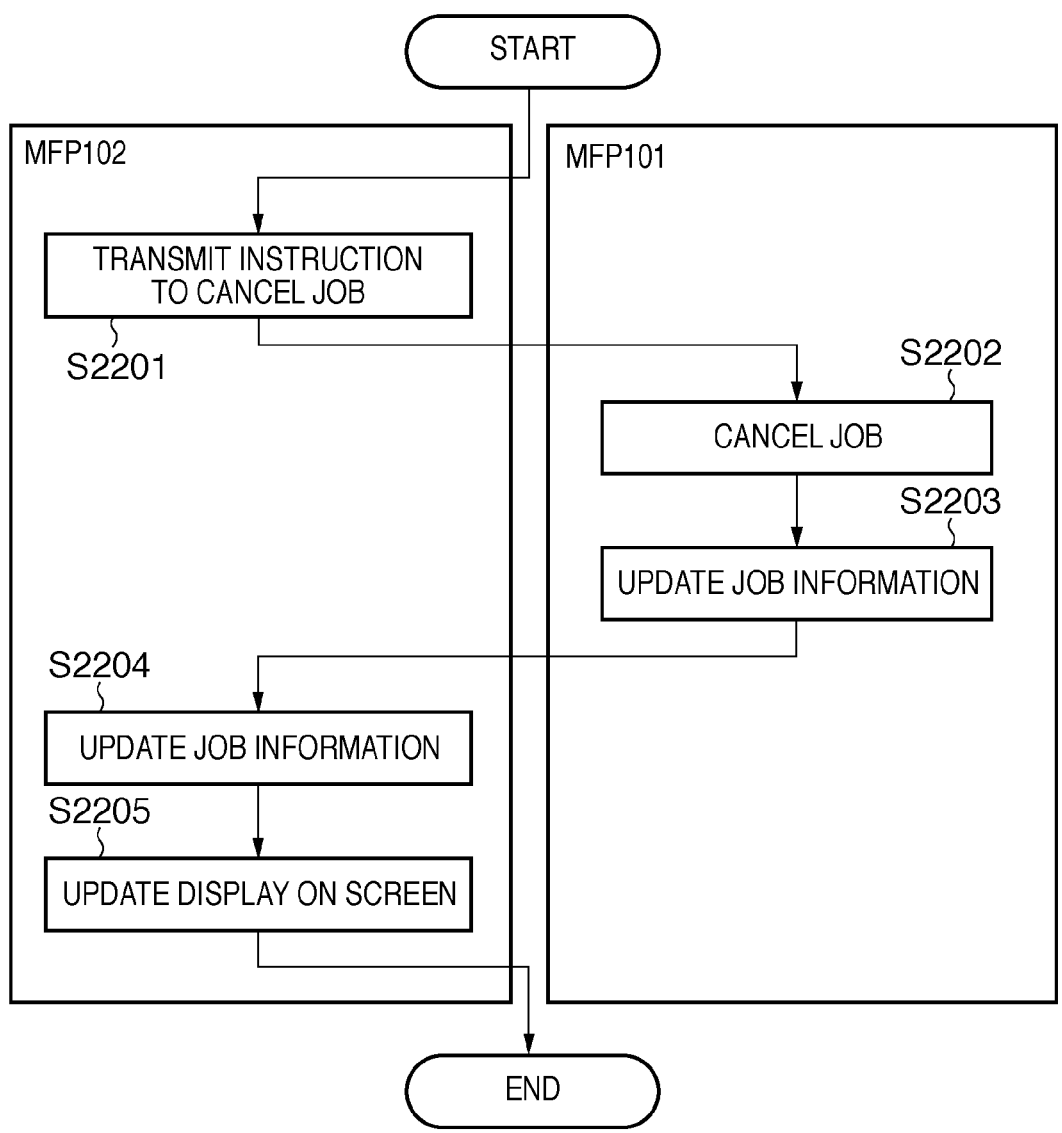
FIG. 22 is a flow chart showing the procedure according to the exemplary embodiment.

FIG. 22 is a flow chart showing a procedure for cancelling an uncompleted FAX job in the MFP 102. This flow chart shows a control procedure where the CPU 201 of each MFP loads a program stored in the ROM 202 or the storage 213 to the RAM 204 and executes the program. On the screen 1101 of the MFP 102, when one of the cooperative FAX jobs is specified and the cancel button 1107 is selected, the MFP 102 transmits to the MFP 101 an instruction to cancel the job currently being selected in the job status list 1103 (in step S2201). At this time, the MFP 102 transmits the receipt number of the job currently being selected in the job status list 1103, to the MFP 101.

Upon receipt of the job cancellation instruction, the MFP 101 cancels the job of interest (in step S2202). At this time, the MFP 101 confirms whether the cooperative FAX job required to be cancelled is the job submitted from the MFP 102, before cancelling the job. Note that a job required by the MFP 102 to be cancelled is inhibited from being cancelled under instructions from the operation unit 218 of the MFP 101. As to the record that corresponds to the receipt number of interest in the job information table 1601, the MFP 101 also enters blanks in the status item 1603 and "OK" in the completion item 1604 (in step S2203).

As to the job required to be cancelled, the MFP 102 enters blanks in the status item 1503 and "OK" in the completion item 1504 in the job information table 1501 (in step S2204).

The MFP 102 updates the display on the screen 1101 (in step S2205). Thereby, the cancelled job disappears from the screen 1101.

Effects of Exemplary Embodiment of the Invention

As described above, when authentication is performed by source information processing apparatuses, but not by destination information processing apparatuses, only the source information processing apparatuses are allowed to refer to or manipulate a job under control. In other words, a cooperative job subjected to authentication processing on the source apparatus side is determined as a highly significant job, so that restrictions are imposed on the reference or manipulation of that job. This improves the security of a job submitted by a user even in the case where a plurality of information processing apparatuses operates cooperatively.

Now, there are some cases where a user, when referring to job statuses on the destination information processing apparatus side, may want to know the position of a desired job in the entire job list scheduled to be run. For this reason, the job status list 1103 and the job status list 1302 display, as their entries, even those jobs that are neither allowed to be referred to nor be manipulated (the contents of such jobs are masked and cannot be viewed). Alternatively, the configuration may be such that the job status lists do not display such jobs, on conditions that those jobs are not the jobs submitted from a currently logged-in user or that their source information processing apparatuses have performed authentication management. This depends on the requirement for security policy on information processing apparatuses (the settings of such apparatuses). As another alternative, the configuration may be such that only an administrator of each apparatus is allowed to display or manipulate any job without any restrictions, with restrictions on the display of jobs and inhibitions or restrictions on the manipulation of jobs being intended only for general users.

Still alternatively, instead of the case where restrictions on the display of job statuses and the manipulation of jobs on the destination apparatus side are imposed depending on whether or not authentication processing has been performed on the source apparatus side, such restrictions may be imposed depending on whether a job of interest is a cooperative job or not. That is, any manipulation of a cooperative job under instructions from the source apparatus side is allowed, whereas restrictions are imposed on the display or manipulation of a cooperative job by the operation unit of the destination apparatus. In other words, no restrictions are placed on the display and manipulation of a job under instructions from the source apparatus side, but restrictions are placed on any other display or manipulation of the job.

Note that, when an MFP has a web server function, a client information processing apparatus using a web browser can control the functions of such an MFP via this web server.

It is feasible, by using an MFP provided with a built-in web browser, to perform processing such as displaying contents on the Internet with an operation unit and printing the contents depending on the details.

In some cases where a user on a destination information processing apparatus side may want to manipulate a job submitted from a source information processing apparatus that has an authentication management function, the above-described built-in web browser can be used. Specifically, using the web browser of the destination information processing apparatus, a web server of the source information processing apparatus is accessed to gain authentication, and thereafter job statuses are displayed for manipulation of a cooperative job.

The present invention is also applicable to an MFP that has the functions of both a VNC (Virtual Network Computing) server and a VNC client. In that case, an access is made from the VNC client of a destination information processing apparatus to the VNC server of a source information processing apparatus, so that the contents on the operation unit of the source information processing apparatus can be displayed on the operation unit of the destination information processing apparatus. This allows the operation unit of a destination information processing apparatus to gain authentication from the source information processing apparatus, and thereafter job statuses are displayed for manipulation of a cooperative job.

For example, the configuration may also be such that when a job displayed with masking is selected from the job status list 1302 and the cancel button is selected, a built-in web browser or a VNC may be activated automatically in accordance with the IP address entered in the source item 1607.

This can further enhance convenience for users.

While the exemplary embodiment of the present invention describes a FAX job by way of example, the application of the present invention is not limited to a FAX job. The present invention is also applicable to any other job such as printing, storing a document, and the like.

Moreover, while the exemplary embodiment of the present invention describes cooperation among MFPs, by way of example, information processing apparatuses to which the present invention is applied are not limited to MFPs. The present invention is also applicable to any other information processing apparatuses such as servers, single-function apparatuses (e.g., scanners, printers), and the like.

Other Exemplary Embodiments

The above-described exemplary embodiments of the present invention can also be achieved by providing a computer-readable storage medium that stores program code of software (computer program) which realizes the operations of the above-described exemplary embodiments, to a system or an apparatus. Further, the above-described exemplary embodiments can be achieved by program code (computer program) stored in a storage medium read and executed by a computer (CPU or micro-processing unit (MPU)) of a system or an apparatus.

The computer program realizes each step included in the flowcharts of the above-mentioned exemplary embodiments. Namely, the computer program is a program that corresponds to each processing unit of each step included in the flowcharts for causing a computer to function. In this case, the computer program itself read from a computer-readable storage medium realizes the operations of the above-described exemplary embodiments, and the storage medium storing the computer program constitutes the present invention.

Further, the storage medium which provides the computer program can be, for example, a floppy disk, a hard disk, a magnetic storage medium such as a magnetic tape, an optical/magneto-optical storage medium such as a magneto-optical disk (MO), a compact disc (CD), a digital versatile disc (DVD), a CD read-only memory (CD-ROM), a CD recordable (CD-R), a nonvolatile semiconductor memory, a ROM and so on.

Further, an OS or the like working on a computer can also perform a part or the whole of processes according to instructions of the computer program and realize functions of the above-described exemplary embodiments.

In the above-described exemplary embodiments, the CPU jointly executes each step in the flowchart with a memory, hard disk, a display device and so on. However, the present invention is not limited to the above configuration, and a dedicated electronic circuit can perform a part or the whole of processes in each step described in each flowchart in place of the CPU.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-181980, filed Jul. 11, 2008, which is hereby incorporated by reference herein in its entirety.

What is claimed is:

1. An information processing system in which a source information processing apparatus is capable of performing a job cooperatively with a destination information processing apparatus, the information processing system comprising:
    an instruction unit configured to cause the source information processing apparatus to send a first instruction to execute a cooperative job to the destination information processing apparatus; and
    a control unit configured to:
        while the instructed cooperative job is being executed or waiting for execution, restrict the destination information processing apparatus from manipulating the instructed cooperative job and enable the source information processing apparatus to manipulate the instructed cooperative job; and
        while the instructed cooperative job is being executed or waiting for execution, restrict the destination information processing apparatus from canceling the instructed cooperative job and enable the source information processing apparatus to cancel the instructed cooperative job.

2. The system according to claim 1, wherein:
    the control unit is configured to receive, from the source information processing apparatus, information about whether or not the source information processing apparatus has performed authentication processing when the instruction unit has sent the first instruction, and
    when the source information processing apparatus has performed the authentication processing, the control unit is configured to restrict the display of at least part of information about the status of the instructed cooperative job at the destination information processing apparatus.

3. The system according to claim 2, wherein the source information processing apparatus is configured to restrict the display of at least part of information about the status of the job that has been subjected to the authentication processing, for any user other than the user who has submitted the job.

4. The system according to claim 1, wherein the destination information processing apparatus is configured to distinguish between a cooperative job and a non-cooperative job when displaying the status of a performed job.

5. The system according to claim 1, wherein:
    the control unit is configured to determine, when the destination information processing apparatus accepts manipulation of an instructed cooperative job, whether or not the source information processing apparatus, when sending the first instruction, has performed authentication processing, and
    the control unit is configured to restrict, when the source information processing apparatus has been determined to have performed the authentication processing, restrict the destination information processing apparatus from manipulating the instructed cooperative job.

6. An information processing method in which a source information processing apparatus performs a job cooperatively with a destination information processing apparatus, the method comprising the steps of:
    causing the destination information processing apparatus to receive a first instruction to execute a cooperative job from the source information processing apparatus;
    causing the destination information processing apparatus to manipulate an accepted instructed job, using a manipulation unit;

while the instructed cooperative job is being executed or waiting for execution, restricting the destination information processing apparatus from manipulating the instructed cooperative job and enabling the source information processing apparatus to manipulate the instructed cooperative job; and while the instructed cooperative job is being executed or waiting for execution, restricting the destination information processing apparatus from canceling the instructed cooperative job and enabling the source information processing apparatus to cancel the instructed cooperative job.

7. A non-transitory computer-readable storage medium storing a computer executable program executable in an information processing system in which a source information processing apparatus is capable of performing a job cooperatively with a destination information processing apparatus, the program comprising:

instructions configured to cause the source information processing apparatus to send a first instruction to execute a cooperative job to the destination information processing apparatus;

instructions configured to, while the instructed cooperative job is being executed or waiting for execution, restrict the destination information processing apparatus from manipulating the instructed cooperative job and enable the source information processing apparatus to manipulate the instructed cooperative job; and instructions configured to, while the instructed cooperative job is being executed or waiting for execution, restrict the destination information processing apparatus from canceling the instructed cooperative job and enable the source information processing apparatus to cancel the instructed cooperative job.

8. The system according to claim 1, wherein the control unit is further configured to execute a second instruction to manipulate the instructed cooperative job in a case where the second instruction is sent from the source information processing apparatus.

9. The system according to claim 1, wherein the first instruction specifies a type of job to be executed in the destination information processing apparatus.

10. The system according to claim 1, wherein:
the source information processing apparatus is a first source information processing apparatus that performs authentication management,
the instruction unit is further configured to:
cause a second source information processing apparatus that does not perform authentication management to send a third instruction to execute a cooperative job to the destination information processing apparatus; and
while the cooperative job in the third instruction is being executed or waiting for execution, enable the destination information processing apparatus to manipulate the cooperative job in the third instruction.

\* \* \* \* \*